Jan. 13, 1953  O. K. KELLEY  2,625,056
FLUID DRIVE AND CONTROLS
Filed Sept. 14, 1946  12 Sheets-Sheet 1

Inventor
Oliver K. Kelley
By Blackmore, Spencer & Flint
Attorneys

Jan. 13, 1953 — O. K. KELLEY — 2,625,056
FLUID DRIVE AND CONTROLS
Filed Sept. 14, 1946 — 12 Sheets-Sheet 3

Inventor
Oliver K. Kelley
By Blackmore, Spencer & Flint
Attorneys

Inventor
Oliver K. Kelley
By Blackmor, Spencer & Flint
Attorneys

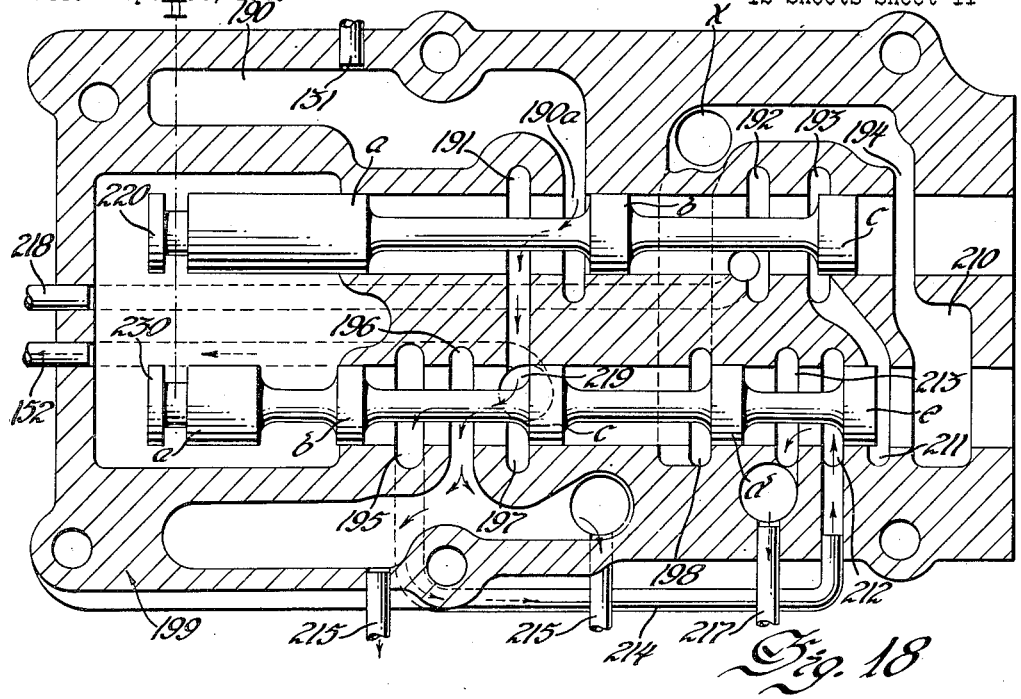

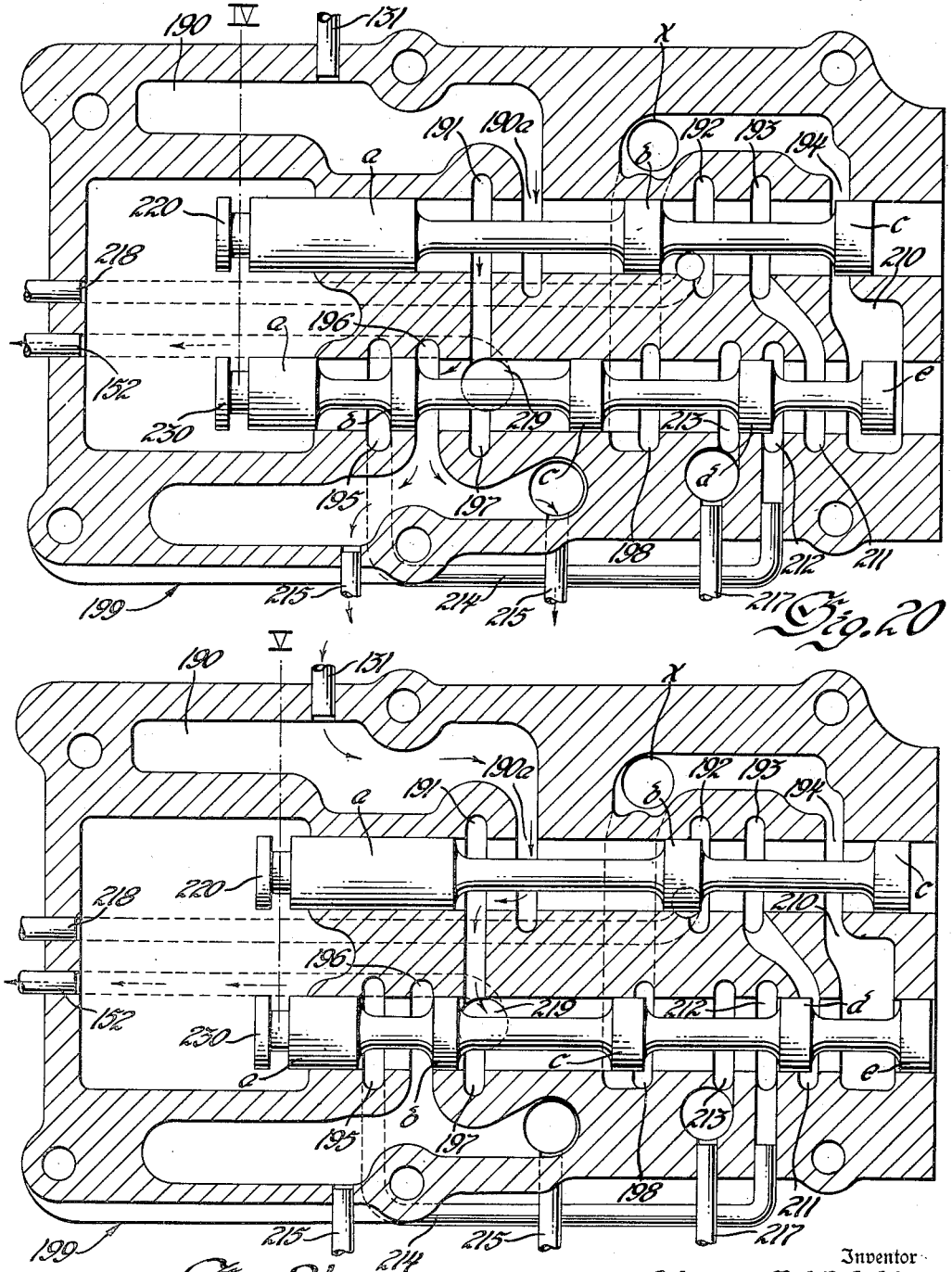

Patented Jan. 13, 1953

2,625,056

UNITED STATES PATENT OFFICE 2,625,056

FLUID DRIVE AND CONTROLS

Oliver K. Kelley, Birmingham, Mich., assignor to General Motors Corporation, Detroit, Mich., a corporation of Delaware Application September 14, 1946, Serial No. 697,092

31 Claims. (Cl. 74—732)

The present invention pertains to power transmission driving mechanism for heavy duty vehicles and other drives, more especially for drive requirements which include the use of torque converting devices associated with variable speed gearing in such a way that a plurality of speed ratio changes may be established without release of the driving torque. The present driving and control mechanism is useful for the drives of tractors, heavy mining machinery, oil well drills and pumps excavating and dirt apparatus, and especially for large heavy military vehicles. It however, may be adapted for smaller, lighter passenger vehicles.

The present invention discloses the use in combination of a high torque engine, with a driving mechanism embodying a sequence of units between the engine and the load shaft, having a torque converter of the fluid type driven directly by or at a fixed ratio of speed with respect to the engine, a variable speed gearing providing reverse and a plurality of forward speed ratios greater than unity between its input and output shafts and a final reduction gear drive connecting the variable speed gearing with the wheels or equivalent driving mechanism of the vehicle. The invention shows a use of this combination which permits the power plant to be maintained at nearly constant speed, and at peak horsepower, there being no interruption of torque during the transition intervals from one variable speed ratio to another, the accelerated inertia of the engine at the time of the shift being absorbed within the fluid torque converter. With this principle, it is not necessary to throttle the engine for shifting from one forward drive ratio to another, and the design characteristics of the torque converter may be taken to provide a stall speed approximately equal to the maximum allowable engine speed, which permits the torque converter to operate efficiently up to its torque capacity, so that its output variable speed ratio range will be in the magnitude of from 1 to 6 reduction up to 1 to 2 reduction, input to output.

A further description of these principles is given in my application for U. S. Letters Patent Serial Number 501,389, filed September 6, 1943, for "Compound Power Transmission," issued December 23, 1947, as U. S. No. 2,433,052, of which the present application for Letters Patent is a continuation-in-part.

There are manifold advantages in the utilization of the teachings and disclosures herein, involving the drive actuation characteristics, the method of speed ratio actuation, the controls and the provision of a fluid system which affords quick ratio shifts effective to provide drive in a newly selected ratio more rapidly than the momentum of the vehicle can fall off with loss of engine torque. As described below, the fluid system provided in the present invention gives another valuable feature, the ability to circulate the working fluid body rapidly under all operating conditions and the further ability to cool the body of fluid to temperature levels which avoid excessive oil oxidation and sludging as well as overheating of the bearing surfaces. The installation of the example herewith demonstrates an assembly in which the oil film area exposed is high, and as will be understood further, the feed and circulation control is equipped to respond to thermal differentials resulting from high torque drive and to divert cooled oil directly to the torque converter working space from the normal pumped flow stream.

Further advantages and features adapted to produce better operation for long continued drive under frequent speed ratio changes will be apparent in the detailed specification following in which.

Figure 3:
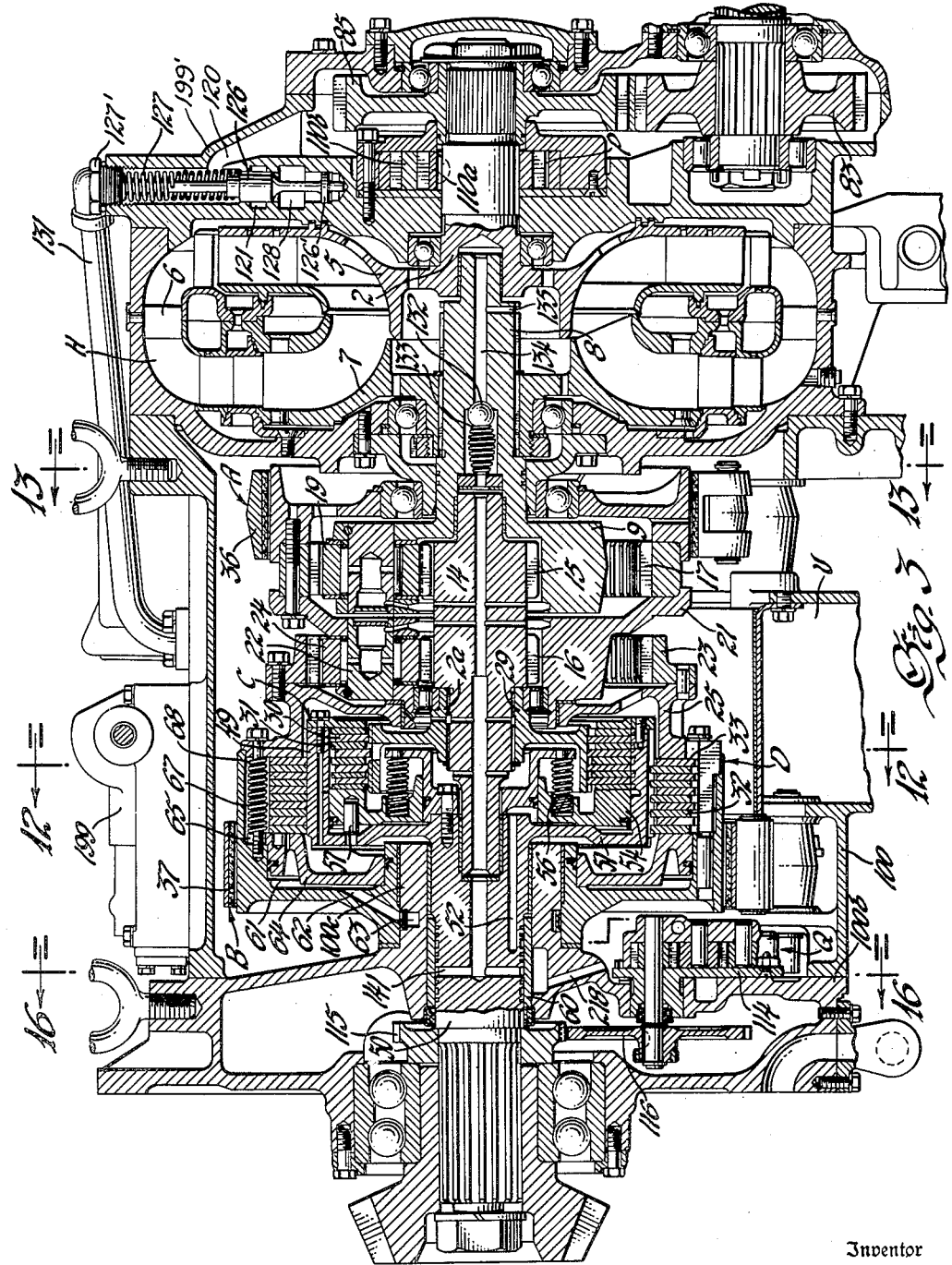
Figure 3 is a vertical elevation in section of the torque converter and gearing assembly of the variable speed unit of the invention, shown in outline in Figures 1 and 2.
Figure 6:
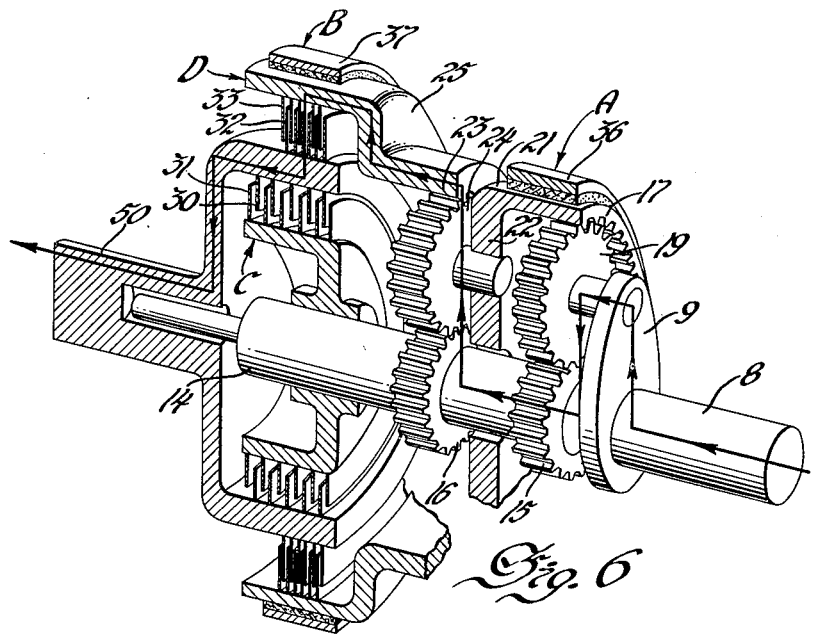
Figure 7:
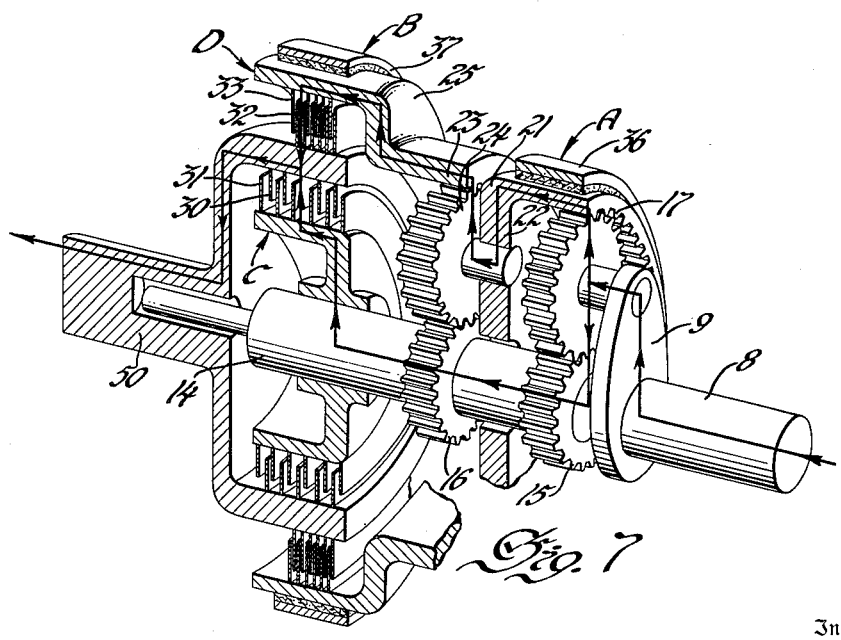
Figure 8:
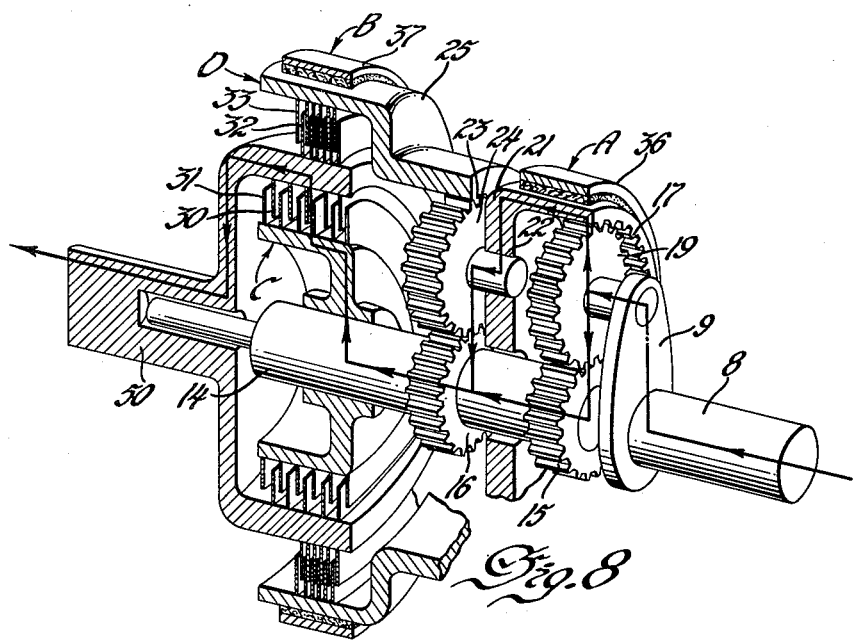

Figure 6 is a diagram showing the actuation method of obtaining reverse drive by the gear unit V of Figure 3. Figure 7 is a similar diagram showing the actuation for drive in direct drive, or first forward speed; Figure 8, that for first overdrive or second forward speed, and Figure 9, that for second overdrive or third forward speed.

Figure 10:
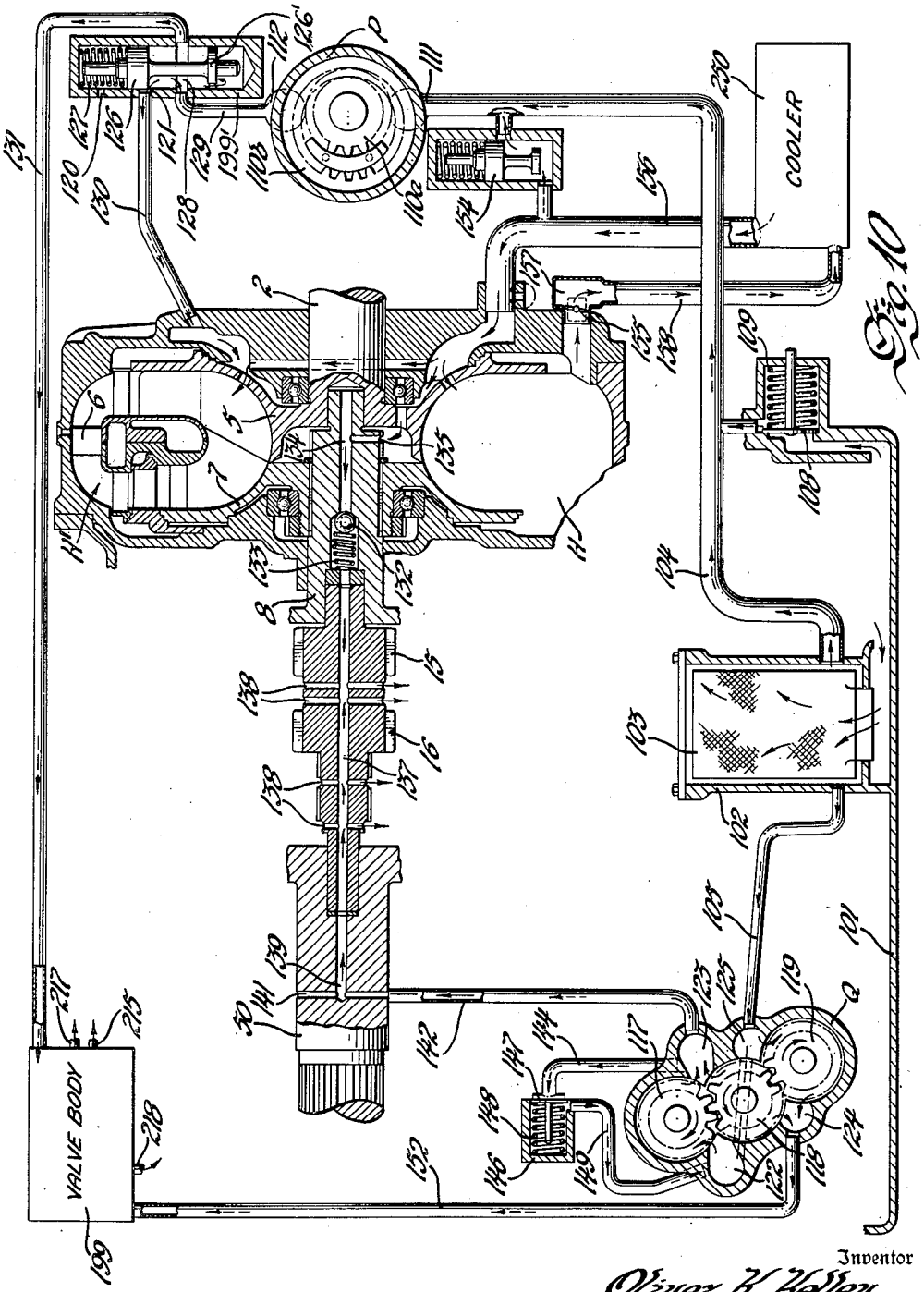

Figure 10 is a diagram of the fluid flow and supply system for the torque converter H, the gear unit V and the controls for the latter.

Figure 11:
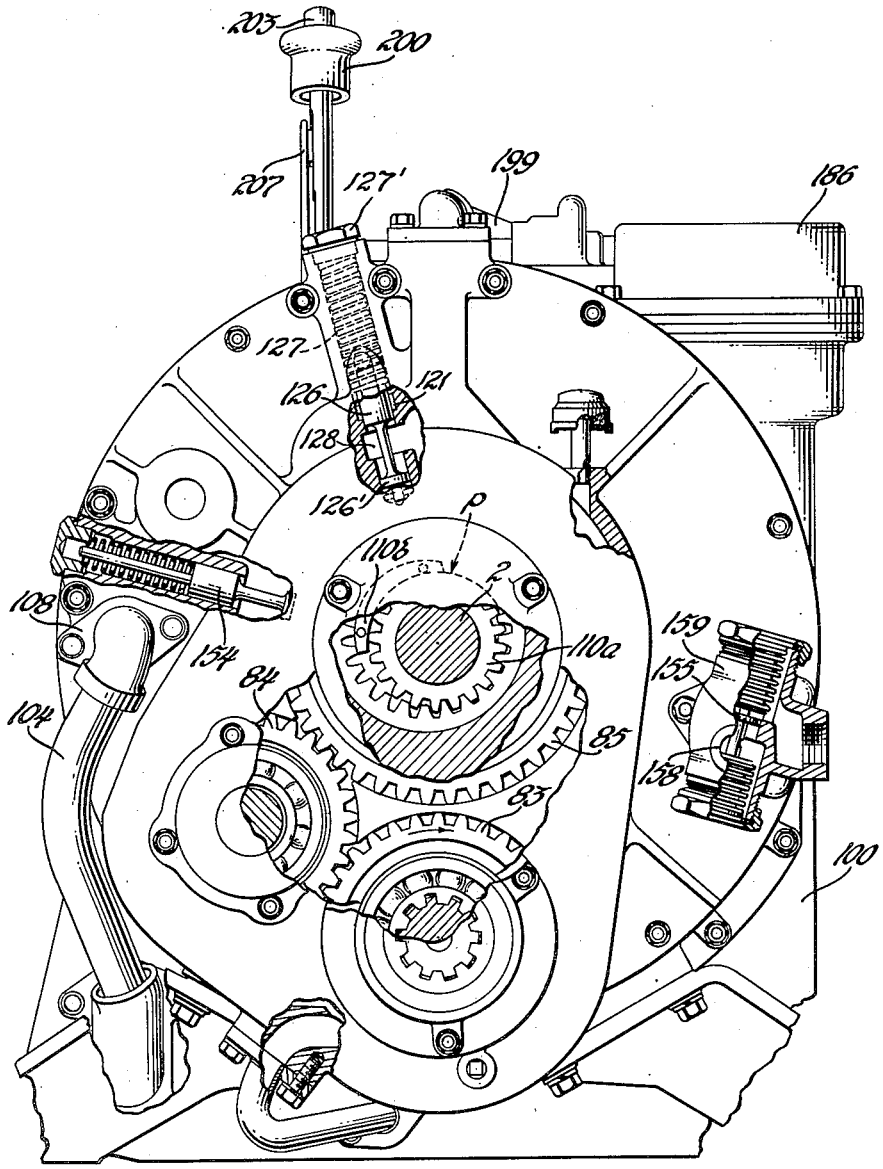

Figure 11 is an endwise view taken from the right of Figure 3, with the end plate of the casing broken away to show the relationship of certain of the parts.

Figure 12:
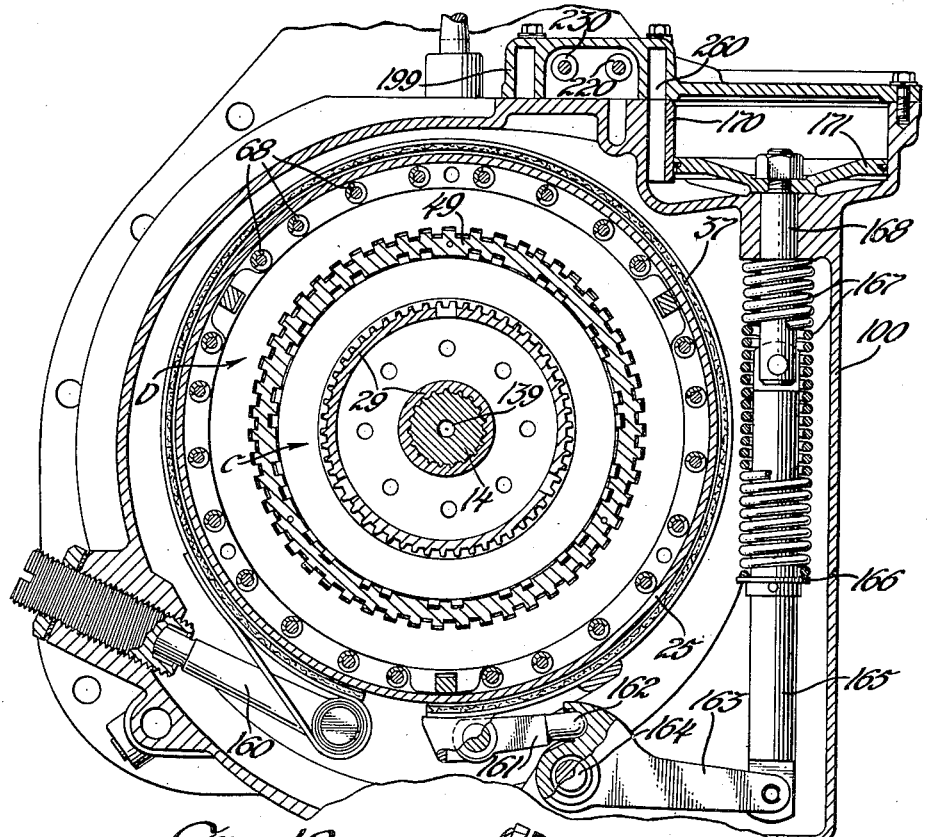

Figure 12 is a section taken at 12—12 of Figure 3 to illustrate the operation of the rear transmission brake of unit V of Figure 3.

Figure 13:
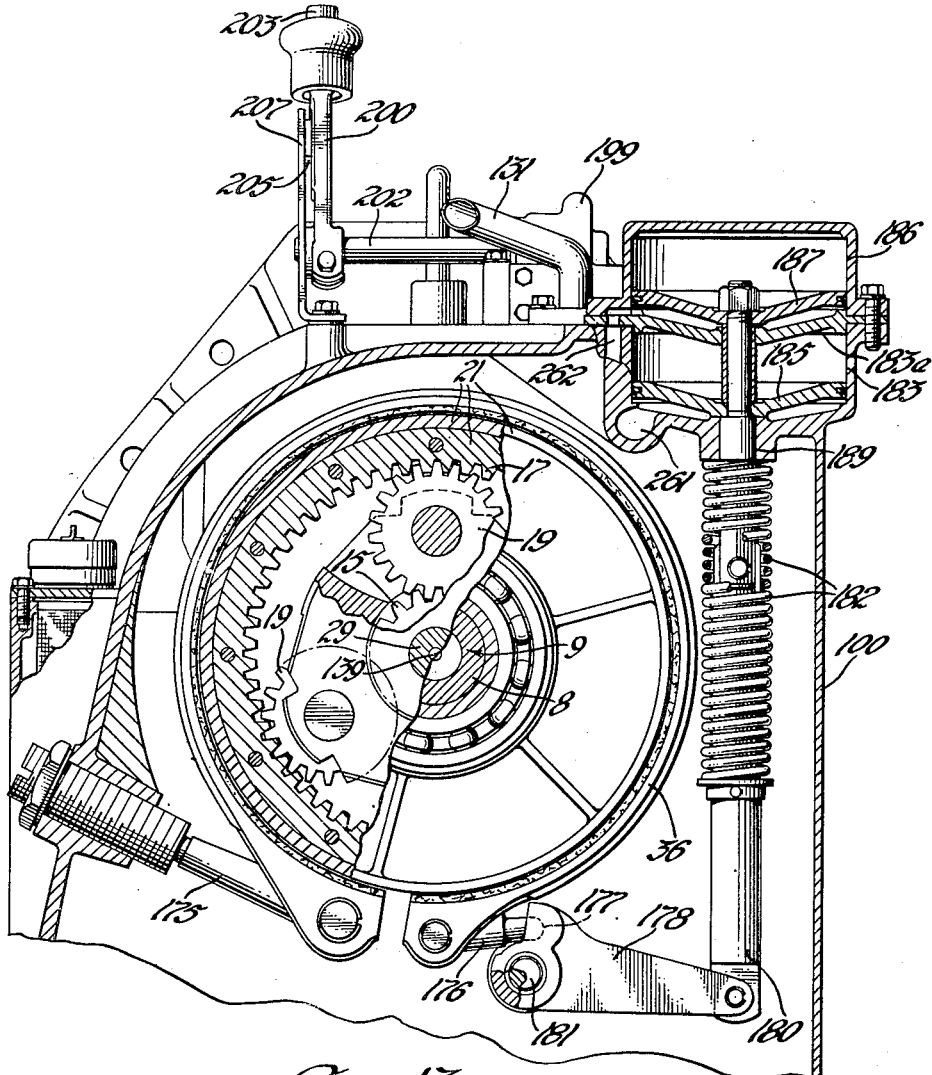

Figure 13 is a similar section at line 13—13 of Figure 3 to show the operating parts for the forward brake unit V.

Figure 15:
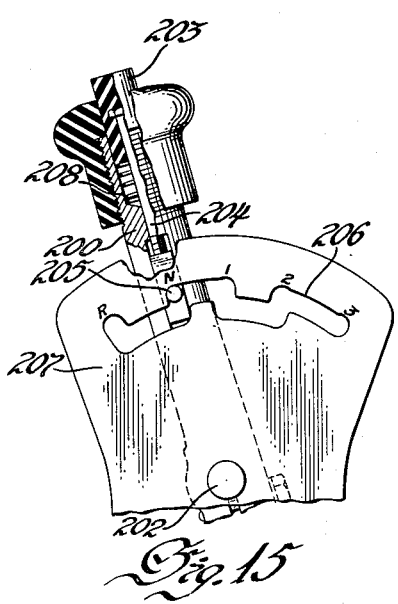
Figure 14:
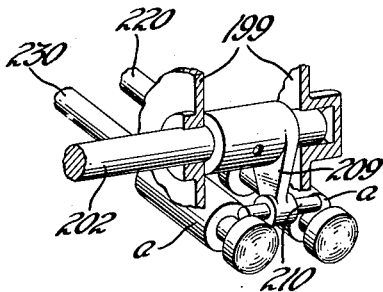

Figure 14 is a perspective of the structure of Figure 12 in part, for the purpose of showing the external controls available to the operator. Figure 15 is a side view of the operator's control mechanism of Figure 12, likewise shown in the upper portion of Figure 13.

Figure 16:
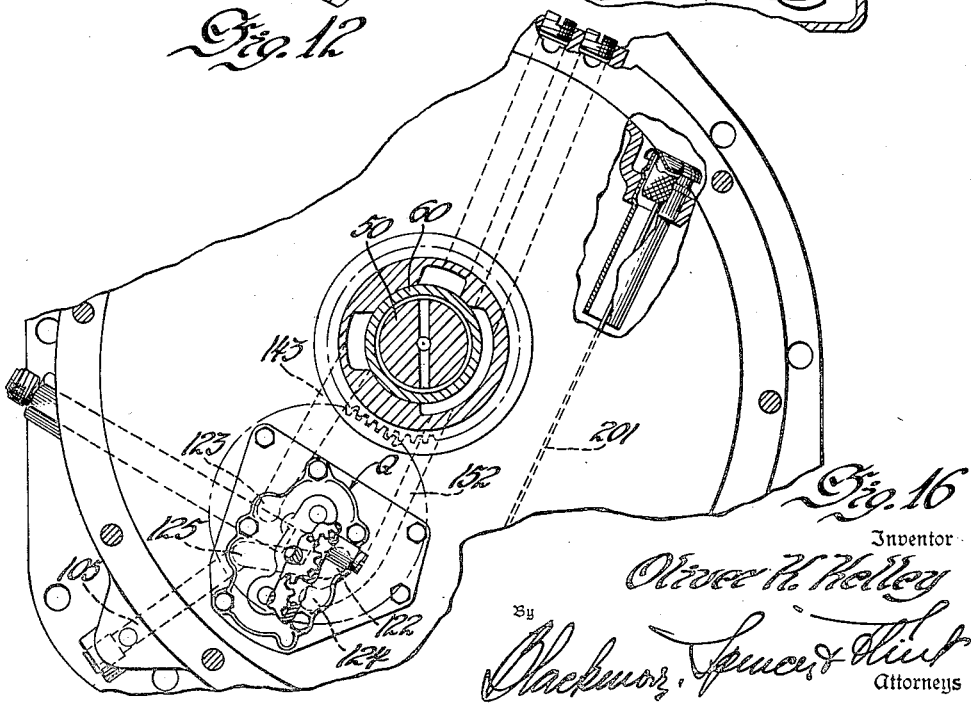

Figure 16 is a section taken at line 16—16 of Figure 3, and is provided for the purpose of showing the connections of the rear pump and the lubricating system supplied by the latter.

Figure 17:
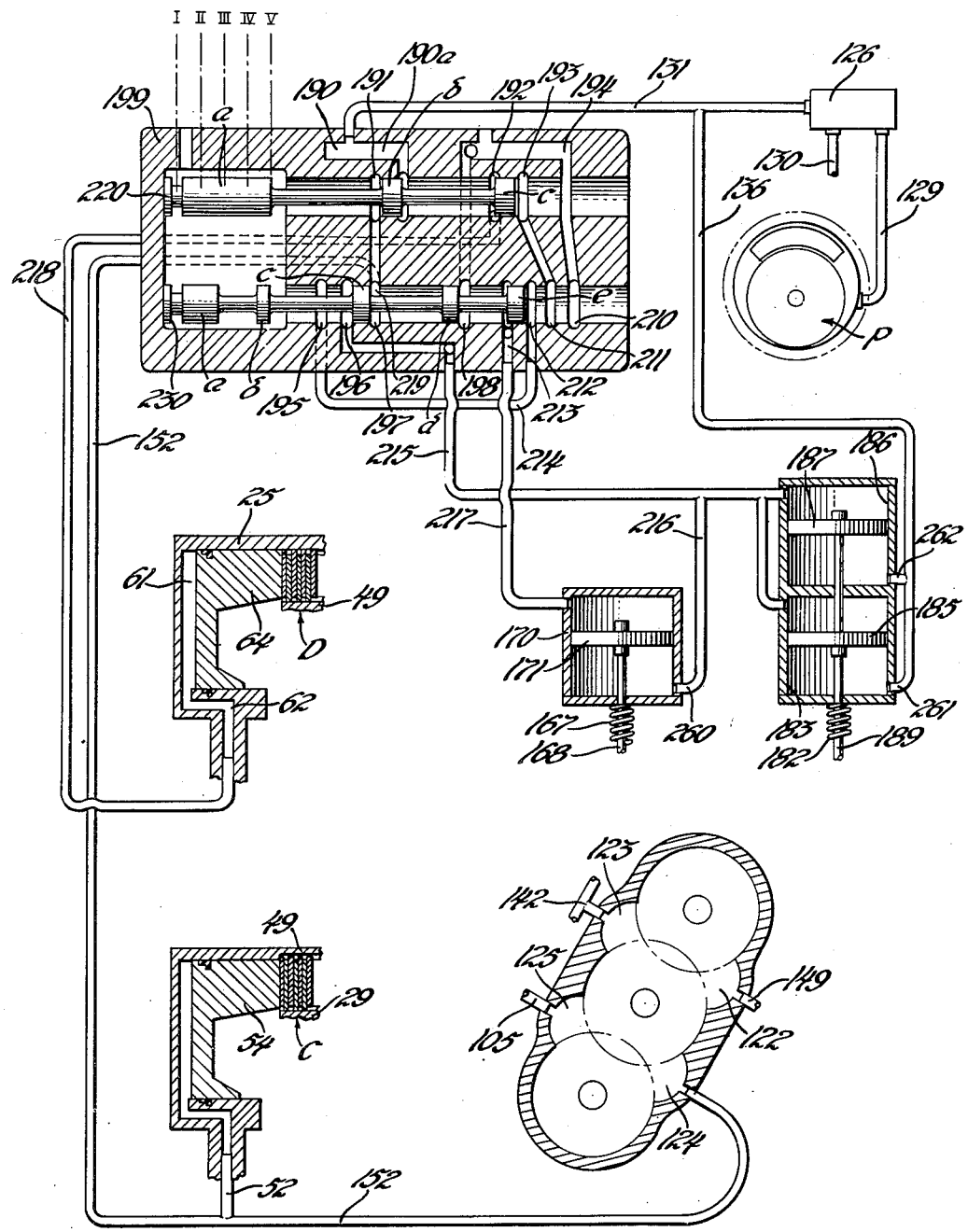

Figure 17 is a diagram of the fluid pressure system of the controls for the structures of Figures 3, 12 and 13, the control valving being shown as for reverse gear drive of unit V. Figures 18 to 21 inclusive, show the valving of Figure 17 as for the neutral, first, second and third forward speeds respectively.

Figure 1:
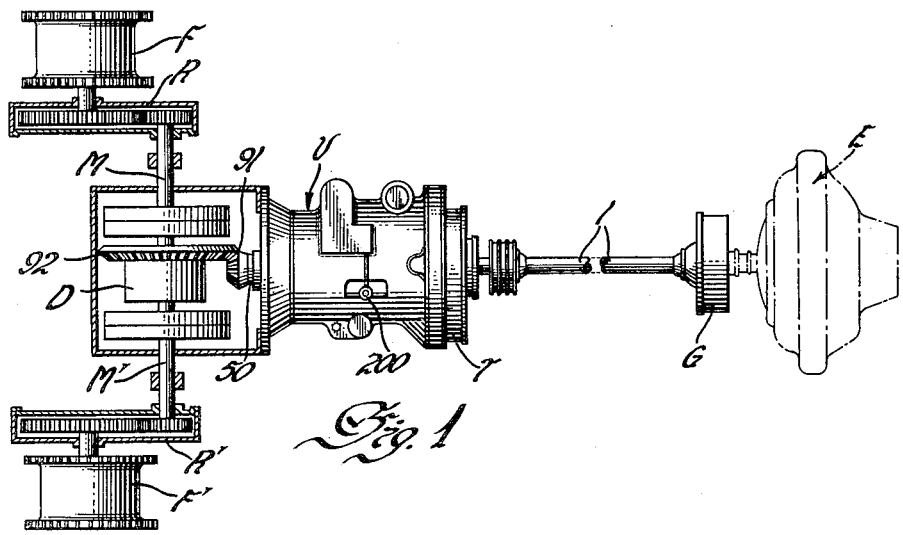
Figure 1 is a top view of the installation of an example of the invention in a vehicle devised to haul heavy loads, showing the engine at the right and the output wheel drive mechanism at the left.

Figure 1 shows in plan view the layout of a driving assembly embodying the invention. At the right, the engine E is shown in outline, driving the shaft 1, connected to the input of the transmission unit V, the output shaft 50 of which is fastened to bevel gear 91 meshing with bevel gear 92 of differential D, connected to the cross-shafts M and M', driving sprocket drums F and F' through reduction gear pairs R and R'.

The transmission assembly V is fitted together as a compact entity with the input gear assembly S incorporated such that the power shaft center line is offset from the main center line. The output shaft 50 and bevel gear 91 project from the rear portion of the unit as shown in Figure 3.

In this installation the driver sits above the transmission unit V, and operates handle 200 which selects the gear ratios of the unit.

Figure 2:
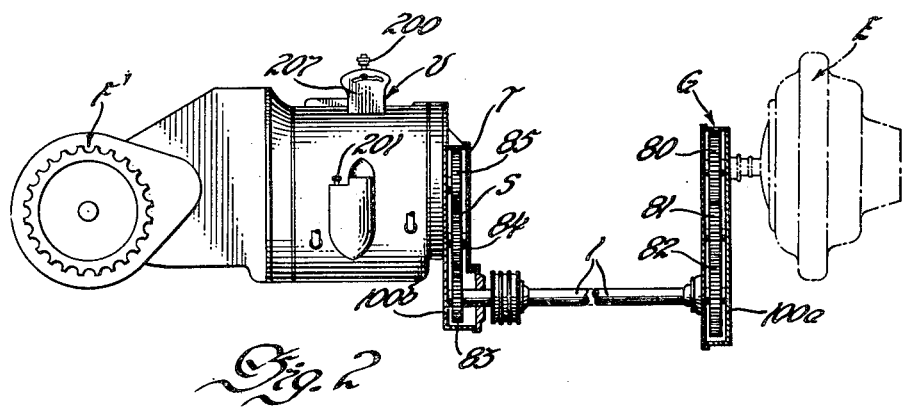
Figure 2 is a side view of the structure of Figure 1.

As shown in the elevation view of Figure 2, the engine E drives shaft 1 through gear train G, consisting of constantly meshed gears 80, 81 and 82; the shaft 1 drives the input of the unit V through a similar gear train S, consisting of constantly meshed gears 83, 84 and 85. Casing 100a attached to the frame of the vehicle supports gear train G, and casing 100b supports gear train S, being attached to casing 100 of unit V, as shown in Fig. 3. The creation of the well space between G and S provides useful room for the vehicle crew and accessory equipment since shaft 1 may be placed below floor level, or in a non-interfering tunnel, removable for service and repair.

Other power train arrangements are possible, as vehicle needs require. On the output side, the divided shafts M—M' may be individually stopped for aiding the steering of the vehicle, but that feature is not directly involved in the present invention.

I will now describe the gearing unit V, shown in detail in Figure 3. The output member 7, of the torque converter H is splined to shaft 8, which shaft carries a flange 9 forming a part of the carrier for planet gears 19, meshing with annulus gear 17 and sun gear teeth 15 of gearbody 14. The annulus 17 is fixed to drum 21 which is integral with a carrier 22 for the planet gears 24 which mesh with annulus gear 23 and with sun gear teeth 16 of gearbody 14, which gearbody is attached to a clutch hub 29 for clutch plates 30. The annulus 23 is attached to a drum 25, inside which drum slide the clutch plates 33. The output shaft 50 is integral with or attached to rotate with a drum 51 which mounts externally, clutch plates 32 mating with plates 33; and internally, the drum 51 carries clutch plates 31 mating with plates 30 of said hub 29.

Brake band 36 is supported by the casing 100 and stops rotation of drum 21, annulus 17, and carrier 22 when energised. Brake 37 is similarly supported and stops rotation of drum 25 and annulus gear 23 when energised, or applied.

For convenience, brake 36 will be further referred to as A; brake 37 as B; clutch 30—31 as C and clutch 32—33 as D. These symbols assist in understanding the pattern of ratios and the actuation and control system, to be explained further herein.

The variable speed transmission unit is shown in part detail in Figure 3. It consists of the input reduction group 83, 85, the torque converter H, the variable speed ratio gearing unit V and the output reduction drive D of output shaft 50 of Fig. 1.

Torque converter input shaft 2 is integral with the impeller member 5. The reaction blades 6 are fixed to the casing 100. Rotation of shaft 2 circulates liquid through the blading in a manner such as is described in Letters Patent U. S. 1,199,359 to Föttinger, issued September 26, 1916, and torque multiplication is obtained over a predetermined speed range, in the driving of the turbine output shaft 8. Further discussion of special features in the operation of the torque converter will be given later in latter part of this specification.

The effective and efficient speed range of the turbine or torque converter unit is determined by the load and desired speed of the vehicle, the power-speed range of the engine E, and the ratios of the units G, S, V, D and R and F, as will be understood by one skilled in this art. In the vehicle for which the present disclosure corresponds, it is desirable to provide peak engine power at around 2500 R. P. M., so that in the fixed gear ratio units G and S, the input speed of the torque converter may be taken at 1.3 reduction. If the power plant provides 900 foot pounds peak torque, the converter may operate at 2000 R. P. M., and handle 1170 foot pounds, with a given converter design. The transmission output in the lowest forward speed ratio, reduced by gearing OD and R may then rotate the sprockets or wheels F at about 5.4 reduction which in this vehicle may result in a low speed forward drive of approximately 12 miles per hour, in first overspeed of unit V, of around 28 miles per hour and in second overspeed of unit V of about 45 miles per hour. These factors may, of course, be varied to correspond with specific vehicle requirements, the preceding data only serving to point out some of the advantages of the novel arrangement of the drive assembly of the invention.

One outstanding advantage is the adaptability provided for high speed, high torque engines, similar to aircraft engines, to drive large heavy vehicles. By the methods herein disclosed, the engine may be operated at or near its torque peak at all times except when it is idling or throttled down. The torque converter unit H provides uninterrupted torque multiplication over a definite speed range, predetermined for making most efficient use of the engine power, and the variable speed gearing likewise provides uninterrupted torque in a wide range of selected speed ratios, one of which yields a maximum torque with the engine at power peak, and an overall ratio reduction in the magnitudes of 30 to 1 or better, above which two overspeed ratios are available when the gradient and surface conditions permit a stepping up of the drive of unit V to 2.3-to-1 or to 4-to-1 ratios.

It should be pointed out that torque shock loads in the drives of large heavy vehicles which have little or no shock absorption facility such as provided for herein, reach critical values very quickly and are of magnitudes such that ordinary clutch and gear equipment to handle these loads become heavy, clumsy and slow in operation, adding to weight, to bearing hazards, and increasing service time and work to a degree not tolerable, for example, in modern military operations. These troubles are emphasized by the tendency of large heavy vehicles to stop suddenly and abruptly when the driving power is cut off, increasing discomfort to crew, and putting severe reverse torque strain on the driving parts. Fluid torque converters such as used herein as an example are desired to be relatively inefficient under overtaking torque, or reverse torque. Referring to Figure 3, a reverse torque component from the vehicle drive tends to rotate the torque converter output shaft 50 at about six times the speed of the sprocket wheels. If the gearing unit V is in direct drive, the converter output shaft 8 is revolved forward at the same speed, but since the efficiency of the converter is very low under reverse torque, the rotor 7 may spin without applying a positive torque effect to the impeller input shaft 2 transmitted back through the gearing trains S and G to the engine shaft, therefore the engine bearings and drive parts are cut off from reverse torque effects, much as if a freewheel clutch were in the power connection between shafts 2 and 8.

This effect does not prevent an abrupt "stop" or self-braking action of large, heavy vehicles, but does prevent damaging reverse torque shocks from being transferred into the gear units S and G and into the engine shaft. As will further be better understood, the arrangement of the invention diminishes the overtaking braking effect by affording ratio shifts under torque, and without interruption of torque through the agency of the torque converter and the gearing unit V, which latter is arranged to provide all gear transitions with a given overlapping residual or minimum torque continuing during the unit V shift intervals. Standard forms of gearing and clutches, in the ordinary automotive manner, do not provide a desirable gear shift for large, heavy vehicles, since the interruption of torque such as by disengaging the main clutch for changing gears, immediately results in the vehicle coming to a dead stop in a few seconds, even on a gentle down grade, quite often before the operator is able to engage the new gear and reengage the main clutch. Since a result becomes a critical factor in climbing a steep gradient, for it prohibits changing gear in the middle of the up-run, since starting a heavy vehicle anew from a dead stop can only be done, ordinarily, in the lowest available gear ratio.

The present invention, therefore adds markedly to the maneuvering facility of vehicles such as military tanks, for the driving gear ratios may be changed at will without risking a dead stall, and the split-second hazard of the vehicle as a fixed target is greatly reduced.

It is found further that a complete actuation release of the torque sustaining members during the shift interval between forward and reverse is not necessary, and as a matter of design may be undesirable. As will be described in detail further herein, the reverse-forward transition is obtained by simultaneous brake-clutch release and actuation, the dwell of the operator's handle in "neutral" only being necessary when a complete release of drive is needed as for stopping.

The ratio and R. P. M. figures given above are merely to illustrate a specific workout of the invention, for clearer understanding, and are in no way restrictive upon utilization of the principles taught herein.

The clutch hub 29 of Fig. 3 is splined externally to accommodate conventional shallow radial slots cut in the inner periphery of clutch plates 30 interleaved with plates 31 which have similar external radial slots to fit the internal splines of drum 51.

The drum 51 of shaft 50 is made with a ring-shaped member 49, having an external circumference matching radially the internal one of the drum to the left of the stack of clutch plates.

An annular piston 54 is fitted into the space inside member 49 and bears against the end plate of group 31 guided on the pins 57, to squeeze the plates 30—31 together, when fluid pressure is admitted to the cylindrical space. The annular piston 54 is equipped with a piston ring (not numbered) and the part 49 has a circumferential sealing ring (not numbered), to prevent leakage of clutch-energising fluid pressure.

Passage 52 cut in shaft 50 delivers fluid pressure behind piston 54, from appropriate passages in gland 60 surrounding the shaft, fed from pipe 152 and the pressure space 124 of the rear pump, and from port 219 of the valve body 199, shown in Fig. 17. Pressure is released by the same fluid circuit, the springs 56 nested between the web of member 49 and piston 54 separating the plates 30, 31. Guide pins 57 prevent cocking of the piston 54.

The drum 51 is externally splined to accommodate the slot teeth of clutch plates 32, mating with plates 33 splined externally to the inner portion of overhanging drum 25 rotating with annulus gear 23, and capable of being stopped by brake 37.

The end wall at the left of drum 25 is recessed to form an annular cylindrical chamber 61 for annular piston 64, which bears against the stack of plates 33, 32 for engaging clutch D. Fluid pressure is admitted to space 61 through passage 62 in the hub of 25 and 51 and from annulus 63 cut on the periphery of sleeve extension 100c of the casing 100 continuous with portion 100b which supports and houses the rear pump 114.

Passage 218 in web 100b leads to the control valve box 199 of Fig. 17, the clutch D being energised or engaged only during reverse or direct forward drive, as will be understood further.

The sets of plates 30, 31, 32, 33 are matched in groups which may comprise bronze or alloy plates working against steel. The steel plates may be pre-formed in dished shape so that a graduated areal engagement may be had, and so that a self-spring release action is obtained as described in Letters Patent U. S. 2,380,680 to Earl A. Thompson which issued July 31, 1945.

Plate 65 pinned to annular piston 64 has portions extending radially into the recesses 67 for springs 68 which serve to positively disengage plates 32, 33 when fluid pressure is relieved from space 61.

Figure 4:
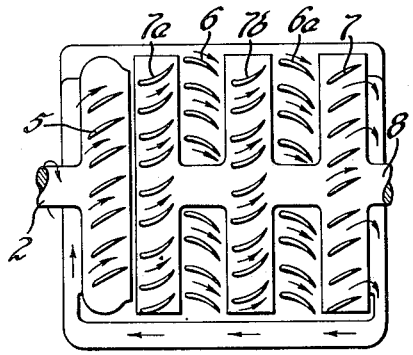
Figure 4 is a diagrammatic view of the flow of the fluid in the vaned passages of the torque converter of Fig. 3.

Figure 4 is a schematic diagram to illustrate the kinetic flow of fluid in a torque converter of the type utilized herein for unit H. While no claims for invention of the converter unit described are made, it is believed proper that a clear idea of such operation be presented. The shaft 2 at the left drives impeller blades 5, the impeller outflow passing through the ring of blades 7a, connected to a shaft 8, and then impinging on reaction blades 6 attached to the casing.

The rotor blades 7b interposed in the output flow from the reaction blades 6 absorb a fraction of the energy, the flow passing through a second set of reaction blades 6a finally through output rotor 7 whence it is returned to the primary impeller. This general principle is old and well known. This type of torque converter provides multiplication of torque over a limited speed range, and when designed for a given torque capacity, it can provide acceptable efficiency in reduction ratios ranging between 2-to-1 and 6-to-1. It does not transmit reverse torque efficiently during intervals when the rolling inertia of the vehicle is endeavoring to spin the engine, and this characteristic, looked upon as undesirable by vehicle drive designers, is utilized to advantage in the present invention.

Other types of torque converters may be utilized in place of the unit described in the present example, and the present invention contemplates the use of the form of torque converter shown in the applicant's application Serial Number 565,592, filed November 29, 1944, now Patent #2,606,460, for improvements in "Combined Transmission," in drive mechanisms for which that fluid torque is adaptable. The torque converter of the above noted application S. N. 565,592 may be directly coupled between power and load shafts, for example shafts 2 and 8 herein, respectively joined to impeller A–1 and rotor B of Fig. 1 of that disclosure, for series drive.

Figure 5:
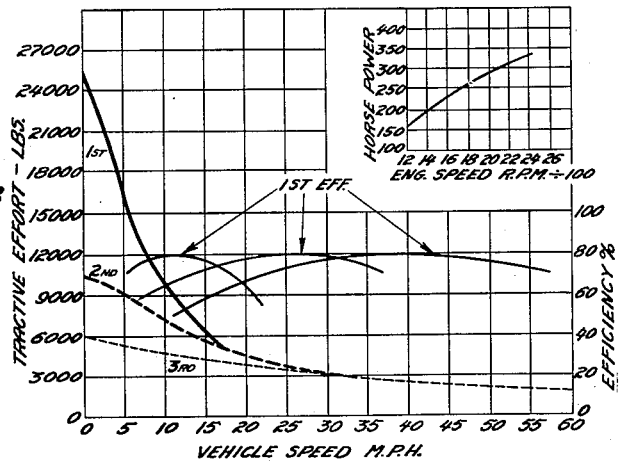
Figure 5 is a diagram of the operation characteristics of the torque converter of Figures 3 and 4.

Fig. 5 in the larger diagram shows the available tractive effort in pounds vertically, left margin, for vehicle speeds from 0 to 60 miles per hour, based on a typical engine horsepower curve such as shown in the upper right diagram. It will be noted that the speed ratio curve merge smoothly into each other, that of the first speed ratio meeting the second speed ratio at about 5000 pounds, tractive effort and at 17 M. P. H., the next transition occurring at 3000 pounds and at 30 M. P. H.

The three efficiency curves opposite the 0–100 "Efficiency" scale of the right hand margin of the large chart, are taken from actual test results, and represent overall efficiencies for the three forward ratios.

It should be observed that the fluid torque converter constantly and automatically changes the overall speed ratio in accordance with speed and load variations, so that the driver, when selecting ratio actually is selecting a driving range, over which constantly variable automatic ratio change occurs. For example, when in direct forward speed, the torque multiplication of the drive may vary between 4.8 to 1.0; first forward speed, 2.05 to 0.43, and in second overdrive from 1.2 to 0.25, these figures being approximations, and merely illustrative. The overlapping of these ranges gives the operator an excellent choice such that especial requirements for economy "cruising" or performance may be easily met.

If the road and gradient conditions suddenly overload the drive such that the engine begins to labor, the operator merely shifts the handle 200 controlling the drive ratio of unit V back to a lower speed ratio setting, the shift to the next ratio being very quick, and since during the interval, torque has been maintained, the vehicle, if a military tank, for example, does not stop abruptly as is common with such vehicles having conventional drives, for the power to the drive wheels has not been interrupted.

For emergency high-speed drive, the engine throttle may be latched in full throttle position, the operator merely adjusting the ratio control handle occasionally for best performance, and in net effect holding down overspeeding of the engine by merely changing the mechanical advantage of the drive according to terrain. This provides the maximum of speed, or miles to be covered per unit of time, so that under the urgent pressure of battle conditions, the operator of a military tank with this invention may extract every bit of performance and speed of which the vehicle is capable, while avoiding torque shocks and damaging overspeeds of the engine.

A further by-product of the invention, is the facility it provides for firing guns while the vehicle, such as a military tank, is in motion. It will be appreciated that under continuous torque drive, with no sudden stops for ratio changing, there is less disruption of the gun mount and controls, since both the deceleration and acceleration effects are minimized by the operator being able to shift ratio during full vehicle motion while the guns are leveled for firing and the vehicle remains in motion with the drive under torque.

These features therefore present a degree of novelty in their combination, as will be understood in detail further.

The schematic drawing of Figure 6 shows the method of obtaining reverse gear drive in unit V the heavy arrow-line indicating the torque path. For reverse, brake 36 is applied to stop drum 21 annulus 17 and carrier 22. Rotation of carrier 9 by shaft 8 causes planet gears 19 to roll around inside annulus 17 and cause forward rotation of compound sun gear body 14. Since carrier 22 is stopped, this causes planet gears 24 to transmit a backward rotation to annulus gear 23. Since clutch D is engaged, this backward rotation is imparted to output shaft 50.

The schematic drawing of Figure 7 shows the method of obtaining direct drive through the planetary gearing. Both clutches C and D are engaged, which establishes locking couples between annulus 23 and the sun gear 16; and through carrier 22 to annulus 17 and sun gear 14, requiring unitary rotation of carrier 9 attached to input shaft 8. The arrow-lines indicate the distribution of torque during direct drive, which is the lowest forward speed ratio.

It will be noted that the couple established in this lowest forward driving ratio is maintained radially through the two clutches, and likewise radially through the gear elements, a distinct advantage in dealing with large powers in heavy vehicle drives, where otherwise the rocking loads between support points would require extra-heavy bearing and casing constructions in order to avoid deflections and misalignments.

The schematic diagram of Figure 8 shows the torque pattern of the gearing unit in first overspeed, when brake 37 is applied and clutch C is engaged, coupling the sun gear body 14 to the output shaft 50. Rotation of input shaft 8 causes rotation of carrier 9 and differential rotation of annulus 21 and carrier 22 with respect to member 14. Since drum 25 and annulus 23 cannot rotate, any rotation of carrier 22 with respect to gearbody 14 will add to the torque component derived from the differential rotation between annulus 21 and gearbody 14.

If annulus gear 17 only were held against rotation, the ratio imparted to gearbody 14 would be that of the group 15—19—17, which in the present disclosure is at approximately 4 to 1 overspeed. However, permitting annulus 21 and carrier 22 to rotate introduces a dividing of the torque such that the ratio imparted to shaft 50 and gearbody 14 rotating together, is a resultant of a fractional component added to the component of the secondary group 16—24—23, discussed further in detail.

Figure 9:
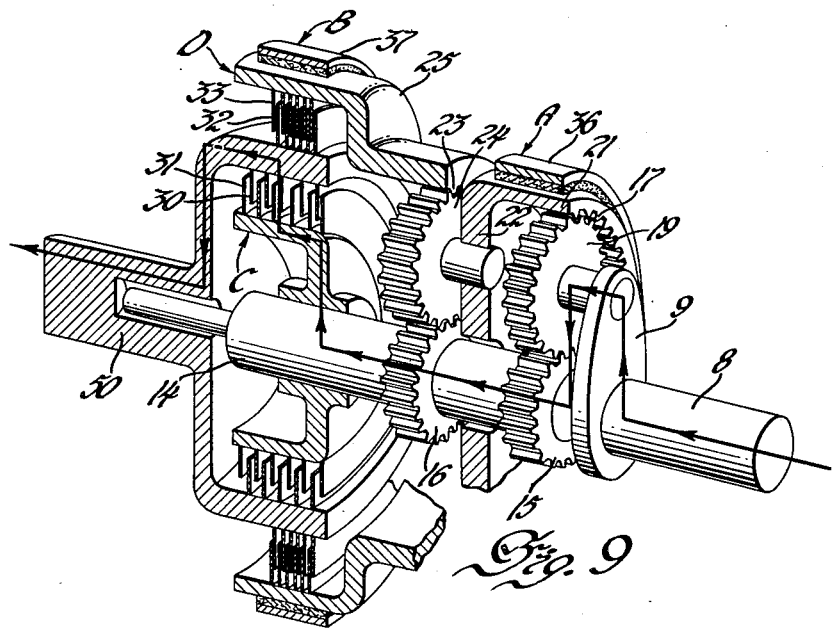

The schematic diagram of Figure 9 describes the operating condition of the gearing unit V in "third speed" or in second overspeed ratio, the highest speed ratio obtained in this assembly. The gearbody 14 remains clutched to the output shaft 50, and the ratio of drive is that of the first group only, annulus 17, carrier 9, planets 19, and sun gear teeth 15, which as noted above, is approximately 4 to 1 overspeed for output shaft.

Capitulating, the overall ratio shift pattern of this assembly is as follows, the × notation indicating units energised or engaged:

|  | A | B | C | D | Fig. |
|---|---|---|---|---|---|
| Reverse | × | 0 | 0 | × | 6 |
| Neutral | 0 | 0 | 0 | (×) |  |
| Direct (1st speed) | 0 | 0 | × | × | 7 |
| 1st Overspeed (2nd speed) | 0 | × | × | 0 | 8 |
| 2nd Overspeed (3rd speed) | × | 0 | × | 0 | 9 |

The capital letters A, B, C, D noted on each of these figures indicate the above energisation pattern.

The following instruction is to state clearly how two over-drive ratios are obtainable herein from the double-reduction planetary gear of the present invention. Assuming in Fig. 3 that the sun gear teeth 15 and 16 have the same diameters, and annulus gears 17 and 23 have the same diameters, one may assign arbitrary diametral values, for example 2.0 for the sun gears, and 6.0 for the annulus gears, and by turning shaft 14 one turn, derive the component applied to shaft 8 through the primary group 15—9—17 with sun gear 15 driving and annulus gear 17 held from rotation. This will be the value for the sun gear divided by the sum of the values for the sun gear and annulus, or 2 divided by 8 which equals one-fourth, or 0.25.

The added component produced by rotation of annulus 17 through its attachment to carrier 22 of the secondary group 16—24—23, is obtained by calculation of the rotational effect on carrier 9 when one turn is given to annulus gear 17 with sun gear 15 held, this value to be multiplied by the component applied to carrier 22 through rotation of sun gear 16 of the secondary group, reacting from the annulus 23 held against rotation. One turn of annulus 17 with sun gear 15 momentarily held, in the primary group, would provide a value consisting of the annulus diameter divided by the sum of the diameters of sun and annulus, or 6 divided by 8, equal to three-fourths, or 0.75. However, the annulus would make only a fractional turn instead of one turn, because of the interaction within the secondary group, which would be one-fourth or 0.25. The incremental value applied to the annulus of the primary group by the secondary is one-fourth of three-fourths, or three-sixteenths, which value has to be added to the primary group value of one-fourth, making four-sixteenths plus three-sixteenths, or seven-sixteenths. This represents the net-turn value of shaft 8 for one turn of shaft 14, expressed in decimals, 0.4375. Taking the reciprocal, one turn of shaft 8 would produce an overspeed of 2.286 for shaft 14, with annulus gear 23 held, as for first overspeed ratio.

This compound ratio method applied to the present gearing yields the ratio of drive in second forward speed, or first overspeed.

The second overspeed ratio is not compounded, but results from the direct interaction of the elements in the primary group 15—9—17, the secondary group idling. The reciprocal of 0.25 is 4.0, therefore for one turn of shaft 8, there are 4 turns of shaft 14, when brake A is held.

With instructions patterned after this reasoning, it is understood that one skilled in this art may obtain the results of the present invention by only minor variations in dimensions, to provide a wide range of utility of this teaching to meet specific continuous torque drive problems.

A gear pump P of Fig. 3 is driven by rotation of input shaft 2, the gear member 110a being keyed to the shaft. The gear idler 110b meshes with the primary member, the interaction creating suction and pressure in a well understood manner.

This pump P draws from the transmission sump 101 through the oil filtering system and delivers pressure to an output pressure line controlled by a regulating relief valve set for 100 pound pressure. The oil flow system is shown in Fig. 10 with the pump P in the upper right portion of that figure, having inlet or suction port 111 and outlet or pressure port 112. Pump P also appears in Fig. 17.

Output shaft 50 of Figure 3 rotates driving gear 115 meshing with pump gear 116 for pump Q supported in a portion 100b of the casing 100, comprising a pump compartment shown in Figure 3. In this compartment are mounted three shafts, supporting pump gears 117, 118, 119 shown in Figs. 10 and 17. In Fig. 10 these gears are arranged with respect to ports 122, 123, 124 and 125, so that a constant supply of oil is furnished for the required lubrication and servo purposes. For convenience, these pumps P and Q will be referred to as the front, and the rear pump. The front pump P driven from shaft 8, rotates at all times when the engine is operating, and feeds through line 129 of Fig. 10 to regulator valve 126 which operates against adjustable spring 127 and opens to pressure line 130, leading to the working space of the torque converter H whenever the pressure generated by the pump exceeds 100 lb. The pressure feed to the regulator valve 126 is delivered between the valve bosses, in which position a second outlet port opens to pressure line 131 connected to the control valve body 199.

Valve 126 appears in Figs. 3, 10 and 11, the operational diagram of Fig. 11 showing the relationships of the system connections. The lower boss 126' is partially cut away so that the effective pump pressure from passage 129 may raise the valve against the force of spring 127. The relief port 120 in casing 199' vents the upper cylindrical spring space, and may be used to vent the lines 129, 130, 131 at extreme or maximum pressure. Screw cap 127' provides for calibration of the action of spring 127. The upper delivery port 121 feeds pressure to line 130, and is variably opened as the valve 126 is subject to pressure changes. The ported space 128 connects lines 129, 131 at all times.

In order to maintain a dynamic flow of liquid through the torque converter, check valve 132 loaded by spring 133 is fitted into the space inside the stub of shaft 8, which latter is drilled out centrally to form an oil passage 134 connected by side passage 135 to the torque converter working space. The gear body 14 is likewise drilled out centrally at 137 leading to side passages 138 for the lubrication of the gear unit V. The transmission output shaft 50 is drilled out centrally at 139 for a short distance concentric with the passage 137, and is fed by pressure delivered through the check valve 132. Side passage 141 in shaft 50 is open to passage 142 which is connected to pressure space 123 of the rear pump Q by passage 142.

This pressure space 123 is likewise connected to cylinder 146 of regulating valve 147 held against the pump pressure by spring 148. At pressures in excess of 15 lbs. pressure relief line 149 is open to suction space 122 of the rear pump Q.

The lower pressure space 124 of the rear pump Q is connected by pressure line 152 to the valve body 199 for the purpose of supplying the control valves for the servo actuation of ratio changes in gear unit V.

Transmission sump 101 contains the oil screen casing 102 and removable screen 103, passages 104 and 105 leading out from the oil screen compartment 102 to the suction porting of both the front and rear pumps.

The rotation of the turbine elements builds up a pressure in the higher velocity zone $H^1$ of unit H, which may be relieved by thermostat valve 155, located in passage 157 leading to pressure line 158, and to the cooler unit 250 shown in Figure 10.

The thermostat valve 155 which may be of common commercial type, is adjustable to open at temperatures of approximately 250° F. so that the cooler can maintain the whole circulating oil body at temperatures below the decomposition point for the oil. The outlet passage 156 from the cooler is connected in two ways, first, to the low pressure zone of the turbine working space, and second by-passed to a regulator valve 154 having an outlet leading to suction line 104 of the front pump. This regulator valve 154 is adjustable to open at approximately 75 lbs. pressure.

By this arrangement of by-passing, the foaming of hot oil, otherwise entirely circulated through the turbine, is avoided, and the bearings of the transmission are adequately lubricated by cooled oil.

The valve 108 is loaded by spring 109 to open at a suction of 5 pounds above that of the sump compartment, to prevent starving of pump P and to provide a proportional input supply with increase of engine speed. The pressure value may be predetermined for desired operating response by selection of valve area and spring force.

Figure 11 is taken endwise as viewed from the right of Fig. 3. The drawing shows the end wall of the casing 100, with the lower portion broken away to show the relationship of the input gearing 83, 84, 85 and the drive for and construction of the input supply pump P.

The regulator valve 126 which controls the supply line pressure delivered by the front pump P to the torque converter H and to the servo- valve control box 199, is shown in section in Fig. 3, and in broken outline in Fig. 11. The regulator valve 154 which controls the by-passing of fluid from the cooler 250 to the suction line 104, of the front pump of Fig. 10, is shown in part section broken away from the end wall of the casing 100 in Fig. 11. Pipe 104 connects the flange 108 with a fitting located at the bottom of the assembly, and is the connection shown in Fig. 10, between the sump 101 and strainer compartment and the intake passage 104 of the pump unit P.

At the right of Fig. 11 is shown a coupling 159 which includes the connection 158 between the working space of the converter and the intake of the cooler 250 of Fig. 10. The thermostat valve 155 which regulates the rate of flow to the cooler, is located inside this coupling, and is adjustable by external connections to open the high pressure zone $H^1$ of the torque converter H to the cooler 250 at a given temperature. The diagram of Fig. 10 shows the location of the thermostat valve 155 in the system.

Figure 12 is a section taken at line 12—12 of Fig. 3 and shows brake 37, and its actuation means for stopping and permitting rotation of drum 25. The brake 37 consists of a band anchored by adjustable stud 160 supported in a boss of the casing 100, the stud 160 being pivoted to the end of the band. The oppostie end of the brake band 37 is pivoted to a strut member 161 which sets in notch 162 of the bell crank lever 163 pivoted on shaft 164 supported by a boss of casing 100. The outer end of the bell crank 163 is pivoted to rod 165, the mid-portion of which carries spring retainer 166. The long spring 167 surrounds the rod 165 and bears upwardly against an extension of the casing 100 which is drilled out to guide piston rod 168, pinned to the upper end of rod 165. This arrangement provides powerful actuating force for the band 37.

In the upper right hand portion of Fig. 12, the casing 100 is formed to provide a working cylinder 170 for piston 171 attached to piston rod 168. Fluid pressure is admitted through passage 260 from the valve body 199 attached to the upper portion of the casing 100, so that fluid pressure controlled by the valving will lift the piston 171, rod 168, and rod 165, against the force of spring 167, to rock lever 163 for applying compressional force to strut 161 and to tighten the band 37 on drum 25. Release of pressure from beneath the piston 171 permits spring 167 to release the band 37.

Figure 13 shows a section taken at line 13—13 of Figure 3, providing a similar mechanism to that of Fig. 12, for the fluid pressure actuation of band 36, which is anchored by adjustable stud 175 held in a boss of the casing 100 and pivoted to the band; the other end of band 36 being pivoted to strut 176, seated in notch 177 in bell crank 178 pivoted to an extension of the casing at 181, and to rod 180 similarly pivoted to piston rod 189, to release the band 37 in the same manner described above, when spring 182 is exerting downward force on rod 180.

In the upper right hand portion of Figure 13, cylinder 183 is formed in the casing 100 to accommodate piston 185 attached to piston rod 189. A disc shaped plate 183a seals the cylinder 183 at its upper end and a second cylinder 186 is attached to the casing 100 concentric to the cylinder 183 to accommodate a second piston 187 likewise attached to rod 189. The fluid pressure for raising piston 185 is furnished through passage 261, and the pressure for raising piston 187 is delivered through passage 262. The operating circuit controlling the flow of fluid pressure to the servo cylinders 170, 183 and 186, are described further in connection with Fig. 14.

Fig. 14 is a perspective view of the control valve operating mechanism connected to lever 200 of Fig. 15 for shifting the valves 220 and 230 of Fig. 17 for selection of ratio shift. The ratio shift valves located within the assembly are reciprocated by the rocking motion of external projecting shaft 202 attached to hand lever 200. Fig. 15 shows the hand lever 200 in part section and said lever recessed to accommodate button 203 of pawl rod 204 which carries guide pin 205 at its inner end, the latter pin projecting laterally as shown in Fig. 15 into slot 206 of guide plate 207 shown in side view of Fig. 15 and edgewise in Fig. 13. The slot 206 is cut to provide shift control stop positions at different angular positions of lever 200 so that the operator will be required to press the button 203 inward against the spring 208, in order to feel the shift positions R, N, 1, 2, 3, marked on the guide plate 207. The guide plate in the positions 1, 2 and 3 may be marked for recommended miles per hour speed range of the vehicle.

Shaft 202 extends inside the valve body 199, and has affixed lever 209 swinging vertically between the valves 229, 230, the pin 210 of lever 209 intersecting the centerlines of motion of the valves, so that rocking of the shaft 202 reciprocates the valves in their bores equally, from one ratio position to the next. The arc of motion of lever 209 is sufficiently short that in net effect, equal linear motions for given angular settings are obtained, without binding. The projecting ends of pin 210 are restrained between the bosses *a* of each valve and the corresponding end bosses, not numbered, so that the relation between shaft 202 and the valves is always mechanically positive.

Fig. 16 is an end view of the transmission assembly taken from the left of Fig. 3, and is sectioned to show the oil level measuring device, the positioning of the pump Q, and the space relationships of the feed porting for actuation of the clutches C and D.

A dip-stick oil level indicator 201 of manual type is provided, as shown in Figs. 2 and 13.

The Figure 16 is taken at line 16—16 in Fig. 3, for the purpose of indicating the connections between the oil feed and relief passages connecting the rear pump and the feed lines which it supplies.

The control mechanism is compactly arranged so that there is a minimum of necessary connection for its operation. Valve body 199 is mounted on the upper portion of the transmission casing 100, adjacent to the servo cylinders 170 and 183, 186. A short shaft 202 projects from the valve body laterally as shown in Fig. 14, and is moved by handle 200 in the fore-and-aft plane to the different ratio-selecting positions. A guide plate 207 marked with the shift positions, is affixed to the side of the valve body 199, so that the entire control assembly may be detached as a unit, for convenience in replacement or repair.

Fig. 17 is an overall control diagram for the purpose of showing the connections between the operating and actuating mechanism for the ratio changing clutches and brakes, the fluid pressure supply, and the control valves.

In this figure, the actuating mechanism for the clutches and brakes are shown schematically; for example, an outline of the clutch cylinder 61 for clutch D is shown with a portion of the piston 64 in section to indicate merely the operational effect of the fluid pressure. The same is true of the servo cylinders and pistons of the other units. The pumps and accessory mechanism are likewise shown schematically. The upper portion of Fig. 17 is a plan view of the valving as it may be seen in place by one looking down on the transmission assembly from the opposite position from the observer of Fig. 3 or Fig. 14 in other words as viewed from the right hand side of the gear box.

Fig. 10 shows the use of a thermostat valve 155 located in the high pressure zone outlet from the torque converter H, variably directing the flow to a cooler unit 250 connected to two delivery lines, one leading back directly to the low pressure zone of the working space of the torque converter H and the other leading to the engine-driven pump P for circulation to the servo control valve body 199. The thermostat valve 155 shown also in Fig. 11, is adjustable for presetting to establish the working temperature of the torque converter at the correct level for the type of drive work to be undertaken.

It will be noted that this primary pump P furnishes oil under pressure to energize and apply the brake A, of Fig. 13 directly, as described above in connection with that figure, and thru the control valving energise the other servo actuators, while pump Q of Fig. 10, driven by the output shaft 50 energises clutch D of Fig. 3 directly, as described in detail below, and supplies the lubrication system and feeds the control valving system for furnishing servo actuation force indirectly. Pump Q provides transmission lubrication thru special feed lines, and pump P furnishes initial supply for filling unit H. The pressures supplied by the pumps meet in the valve body passages between bosses *a* and *b* of valve 220 and ports 191 and 190*a*.

Valve body 199 is drilled out with two parallel bores for the control valves, as shown in Fig. 17.

The upper bore, for valve 220, is open at the left to exhaust, the unnumbered chamber space connecting back to the suction sides of the pumps. This bore has ports 191, 190*a*, 192, 193 and 194 in order, from left to right. The parallel lower bore is also open to exhaust in the same chamber space, and has ports 195, 196, 197, 198, 213, 212, 211 and 210.

Ports 191 and 197 are cross-connected. Exhaust space above 210 is connected thru port 194, which is open to an upper exhaust space X marked in Figs. 18, 20 and 21 and connected as shown by dashed lines, with port 198. Ports 193, 211 are cross-connected.

Pump pressure is delivered through line 131 to pressure space 199 and to feed port 199*a*, whence it is controlled by valve 220.

Port 192 is connected to clutch pressure passage 218, as shown by dashed lines. Port 197 is similarly connected to clutch pressure passage 152. Ports 195 and 212 are connected by passage 214.

Port 196 is open to a pressure outlet space below the lower bore, to which brake control passages 215, 216 connect. Port 213 is connected to passage 217.

The upper valve 220 has a projecting flange for engaging the external control mechanism, and has bosses, *a*, *b* and *c*, from left to right, spaced as shown in Fig. 17.

The lower valve 230 has a similar projecting flange and five bosses, denoted *a, b, c, d,* and *e,* from left to right, spaced as shown.

The bore porting is cut away radially outside the cylindrical surface of the bores, and the valve bosses permit or block interport flow, in accordance with a predetermined ratio control regime. The spacing of the valve bosses and porting is such as to provide a sequential change of ratio by transmission unit V between reverse and highest forward speed ratio, with neutral low and intermediate ratios between, there being five step ratio positions of the valves 220, 230, indicated by I, II, III, IV and V.

These two valves move together in equal steps between the stated positions, as will be noted from their positioning in Figs. 17 to 21.

Main line pressure from the front pump P is available to apply brake A at all times through line 136, and since this brake is only required during reverse and third forward (2nd overspeed), it is necessary that equalizing pressure be furnished above both pistons 185, 187 through line 215 for neutral, first forward (direct) and 2nd forward speed (first overspeed). The instructions below likewise apply to the valve control system Figures 18 to 21 which show the operations for the II, III, IV and V conditions.

The valve 230 is therefore arranged in its travel from left to right to furnish pressure to line 215 in the following pattern:

|     | Pressure |
| --- | --- |
| I. Reverse | 0 |
| II. Neutral | × |
| III. Direct | × |
| IV. 1st overspeed | × |
| V. 2nd overspeed | 0 |

This pressure is delivered through port 196 when valve 230 is in one of positions II, III or IV only.

Since the rear brake B is desired to be actuated only during second forward (first overspeed) and to be released at all other times, the pressure line 215 feeding port 260 and cylinder 170 below piston 171, is fed by valve 230 from port 196, when the valve 230 is in position IV only. Equalizing pressure above piston 171 is available when valve 230 is in the direct (III) or neutral position (II). This connection is through port 195, passage 214, ports 212, 213, passage 217 and cylinder 170.

From left to right, valve 230, as shown above furnishes not only pressure to line 215, but also to lines 216, 217, as follows:

|     | Pressure In 216 | Pressure In 217 |
| --- | --- | --- |
| I. Reverse | × | 0 |
| II. Neutral | × | × |
| III. Direct | × | × |
| IV. 1st Overspeed | × | 0 |
| V. 2nd Overspeed | 0 | 0 |

This sequence will be understood further by reference to Figures 18 to 21 and the corresponding description below.

With the valves 220 and 230 in 1st overspeed position, as in Fig. 20, pump pressure from line 131 in space 199 passes through port 191 to port 197, is led through port 196, and becomes available in lines 215 and 216. At this time, boss *d* of valve 230 blocks feed to line 217.

In making the transition between positions IV and V it is important to arrange the valving so that when the pressure which was preventing brake A from being actuated, is relieved; a simultaneous shift of pressure to release brake B occurs, as described in detail further.

It is further useful to examine the functions of the valve operation with respect to clutch operation. Valve 220 alone controls the operation of clutch D, by means of pressure delivered to line 218 from port 192. Its boss *b* in reverse setting I (Fig. 17) is to the left of port 190a and boss *c* seals off the exhaust port 193, therefore clutch D is engaged. In neutral (II), as shown in Fig. 18, boss *b* cuts off the feed port 192, and boss *c* opens to exhaust port 193. In first forward speed, Fig. 19, valve 230 delivers pump pressure through cross connection 214 and ports 212, 211 to 193, whence to port 192 and line 218 to energise clutch D. In second and third forward speed, Figs. 20 and 21 port 192 and line 218 are open to exhaust and clutch cylinder C1 of clutch D is drained by the connecting passages thru parts 192, 193, 211, space 210 and outlet X.

Clutch C is energised by pressure in line 152, only cut off for reverse drive, when boss *c* of valve 230 is to the left of port 197, as shown in Fig. 17, the upper port 191 being open to exhaust by boss *a* of valve 220 exposing the end of the bore. In Figs. 18 to 21 clutch C is supplied pressure through port 219, for neutral and all forward ratios.

As will be understood further, in detail, the valve shaft 202 occupies five separate angular positions for handle 209 of Fig. 15, and the pawl or pin 205 is arranged to occupy definite stations in the slot 206 of guide plate 207, for these positions. This control arrangement is believed superior to the generally known method of notching a sliding valve at station points to intersect a locating, spring-loaded pawl or poppet. The present method provides for the operator a feel that the handle has arrived in a definite ratio position, and the operator is always enabled to choose further shifts, being required to operate the button 203 of handle 200, in order to make them. This control method discourages skipping through a ratio without dwell, and therefore avoids excessive torque increases on the gearing and shafting, such as might be experienced if the operator's handle 200 could be moved suddenly without dwell for example, from third forward back to first overspeed. Avoidance of sudden excessive torque variations is highly desirable in large heavy vehicles for which the present invention is especially adapted.

The desired dwell ranges between reverse and neutral and from first to second forward speeds provide momentary pauses in these shifts, since they require the operator to press and hold button 203 against the spring 208.

Figures 18 to 21 inclusive are views of the valve body 199 and valves 220, 230 similar to the showing of Fig. 17, and are given to illustrate the successive shifting of the valves to and from the five operative positions of the control mechanism. Fig. 17 shows the valves 220 and 230 as they are stationed for reverse drive. It will be noted in this view that the front pump pressure in line 131 is only used to supply fluid to line 218 for energizing the piston of clutch D. The large arrows in the passages of Figs. 18 to 21 inclusive indicate the presence of energising pressure.

Fig. 18 shows the distribution of pressure by the valving to the front and rear brake cylinders, and to pressure line 152 for clutch C, for neutral.

Fig. 19 shows the flow of pressure for establishing drive in 1st forward speed or direct, the arrangement delivering pressure not only to those just stated in connection with Fig. 18, but also to pressure line 218 for energizing clutch D.

Fig. 20 shows the arrangement of the valving for establishing 2nd forward speed or what may be called 1st overspeed. In this, as concerned with Fig. 19, it will be noted that of the five pressure lines, line 218 for energizing clutch D, and 217 for releasing the front brake A are both now without pressure.

The valve arrangement of Fig. 21 is to provide drive in 3rd forward speed which may be regarded as the 2nd overspeed ratio. This furnishes pressure only to line 152 for energizing the clutch C.

The detailed instructions with respect to the porting are given further.

*Reverse shift arrangement (Fig. 17)*

The control valving is shown as set for reverse drive, in Fig. 17.

Valve 230 has bosses a, b, c, d, e, in order from left to right. The space between its bosses b and c in reverse, connects ports 195, 196 to exhaust.

The space between bosses c and d is open to pressure port 197, but no pressure is delivered from line 131, the pressure being balanced between the adjacent faces of bosses c and d.

Pressure lines 216, 215 are open to exhaust, and also ports 212, and 211.

Main line pump pressure in lines 131, 136 is applied to both pistons 185, 187 of brake A to load band 36.

The valve 220 in its leftwardmost position, has its boss b separating ports 191, 190a, and the space between bosses b and c connecting pressure port 190a with feed port 192 for line 218 and clutch D, only.

Port 195 of passage 214 is open to port 196. As the vehicle moves in reverse, the rear pump Q reverses its pressure and suction effects, and may drain lines 152, 215 and 216, and space 219.

Brake B is not applied since no pressure can be delivered to raise piston 171. Clutch C is not engaged since rear pump Q runs backwards when the shaft rotates reversely, draining line 152 and connected passages.

In reverse ratio, clutch D is loaded by pressure in line 218, from port 192 of valve 220; and since brake A is desired to be energised, pressure is relieved from above pistons 185, 187 through line 215 and ports 196, 195 permitting pressure from line 136 to raise the pistons and rod 189. Brake B is desired to be held inactive, hence pressure is relieved from both sides of piston 171, that above being open to exhaust through 217, and 196, and that below through 216, 196 and 195. With no fluid pressure in cylinder 170, brake spring 167 pulls piston 171 down, and assures release of brake B.

*Neutral shift (Fig. 18)*

In neutral setting valve 220 opens pressure port 190a to port 191 and to port 197 of valve 230.

This delivers line pressure to release the front brake A through line 215, and to apply rear brake B through line 216. The boss d of valve 230 stops exhaust flow through port 198 and line 217.

Clutch D is released since line 218 is open through the connection of ports 192, 193 and 211 to exhaust.

The pump line pressure in 197, 196 is also delivered to 195 cross connection 214 ports 212, 213 and line 217 to release rear brake B, there being now equal fluid pressure above and below piston 171, its spring 167 disengaging it.

The use of the principle of suspended or balanced pressure in this manner, permits quick actuation by merely relieving the holding-out, or equilibrating pressure of the brake in question.

To facilitate understanding of the above data, the following table of connected events is given:

*Brake A.*—Balanced pressure above and below both pistons 185, 187; spring 182 releases brake.

*Brake B.*—Balanced pressure above and below piston 171; spring 167 releases brake.

*Clutch C.*—Connected to main line pressure of front pump 110.

*Clutch D.*—Released; porting 192, 193, 212 open to exhaust.

*Shift to first forward speed (direct) (Fig. 19)*

In shifting from neutral to first forward speed ratio, it is desired that the brakes A and B remain released as they were in neutral.

The shifting of the valves 220, 230 one step to the right from the II to III position of Fig. 19, does not therefore, change the pressure delivery to ports 196, 195, 212 or 213, from 190a and 191 of valve 230.

Since both clutches C and D are required to drive in first forward speed, the pressure from ports 190a, 191 passes to port 197 of valve 230, without disturbing the brake cylinder pressure delivery as it had been in neutral. From 197 the pressure flows to port 215 and line 152 to cylinder 53 of clutch C, and to port 195, cross connection 214 ports 212, 211, up to ports 193, 192 of valve 220 and to passage 218 leading to cylinder 61 of clutch D. The tightness of fit of the teeth 118, 119 of the rear pump pressure is relied upon to assure loading of the clutch C, with the vehicle standing still. As the vehicle gets into motion, there is an augmented pressure in line 152 and clutch cylinder 53 to increase the torque capacity of clutch C, from the rotation of the rear pump.

*Shift to second forward speed (Fig. 20)*

The transition to second speed from first forward speed (direct) required that clutch D be released, that clutch C continue to drive, brake B to become engaged, and brake A to remain released.

The valves 220, 230, are shifted to the right from position III to position IV, or as shown in Fig. 20.

Boss c of valve 220 uncovers exhaust port 194, so that line 218 of clutch D is drained. Port 215 remains connected to port 197, therefore clutch C is still loaded by the pressure of both pumps. To engage brake B, it is necessary to relieve the pressure from the upper face of piston 171 through line 217. This is accomplished by boss d of valve 230 closing off the space between ports 213 and 212, and by exposing port 213 to line 217 to exhaust port 198.

When in first overspeed or second forward speed, the valves 220, 230 therefore control the pressure as follows: valve 220 delivers pressure from line 131, port 190a, to port 197 of valve 230, its boss c closing off exhaust port 194, while the space between bosses b and c of valve 230 connects port 197 with 196, admitting holding-off pressure to the cylinders of both brakes.

Where before, brake A had balanced pressure above and below its pistons 185, 187 and brake B was also subject to balanced pressure, the shift to the position IV of the valve 230 interposes its boss b cutting off the pump pressure from port 195 and the cross connection 214, while pump pressure still exists in port 196, and in lines 215, 216, that in line 215 balancing the pressure above pistons 185, 187 of brake A, springs 182 biasing the band 36 to release position.

Shift to third forward speed (Fig. 21)

Now in shifting from second forward (first overspeed) to third forward (second overspeed) it is required that a simultaneous release of brake B with actuation of brake A occur, that clutch C remain engaged, and clutch D remain disengaged.

To accomplish this, the valves 220, 230 are shifted to position V from position IV. Clutch D which had been relieved by exposing port 192 to exhaust, still retains that relationship, boss $b$ of valve 220 stopping at the left margin of port 192. Clutch C is still supplied by pressure from port 197 to port 219 and line 152 augmenting that from the rear pump.

To release brake B requires that balancing pressure be restored above piston 171 by line 217. To actuate brake A requires that pressure be relieved from above the pistons 185, 187, through line 215. These two results are obtained by the arrangement the bosses and ports of valve 230 which connects the balancing pressure line 215 for brake A to both the upper and lower chambers of cylinder 170. Then as the pump supply at 197 is cut off from 196 which had been used to hold brake B engaged and brake A balanced out, the trapped fluid above the pistons 185, 187, is now urged to flow back to line 215 by front pump pressure in line 136 raising the pistons 185, 187. Boss $d$ of valve 230 opens exhaust port 198 and line 216 of the lower chamber of cylinder 170, drains to port 195, cross connection 214, and ports 212, 213; and line 217 drains to the port 213 of valve 230. The spring 167 of rod 168 lowers piston 171 and disengages brake B, the rate of release of net pressure from above pistons 185, 187 controlling indirectly the degree of actuation of brake A while providing a simultaneous equalization of pressure above and below piston 171, for graduated control of release of brake B.

By this method a closely controlled transfer of torque reaction from brake B to brake A is provided, the restricted outflow from lines 216, 217 and 215 providing a fluid pressure interlink in the brake applying action for brake A. As will be understood further, torque overlap is desirable in this operational sequence.

A useful factor in the smooth operation of the overspeed reaction brakes A and B is the direction of wrap of the bands 36 and 37 with respect to the direction of reaction torque applied to the drums 21 and 25 during various ratio change intervals. When unit V is directly coupled, with drums 51, 25 at unit speed with clutch hub 29 of Figure 3, the locking couples through the gear groups require the assembly of gears to rotate together at unit speed.

For the second forward speed, drum 25 is brought to rest, and clutch D disengaged so that this operation is possible. Now release of clutch D without retarding drums 25 or 21 would cause the acceleration of carrier 9 since the engine would be relieved of load, spinning planets 19 forward. This would impart a forward component to annulus 17, at overspeed. In the next group this overspeed ratio is applied to carrier 22, reaction occurring on sun gear teeth 16, so that annulus gear 23 receives a second overspeed ratio, drum 25 having a tendency to speed up proportionally to the differential of shaft 8 over that of shafts 50, 14.

Unless brake 37 restrain the run-away tendency of drum 25, the inertia and speed effects on the parts involved in these differential rotations could result in shocks and overheated bearings, reducing the useful life of the mechanism very considerably.

It is therefore highly essential that the energising period for brake 37 be as short as possible during the exhausting of the cylinder 61 of the clutch D, and that there not be a no-torque interval in this transition. The valve control sector of Fig. 15 is arranged so that the handle 200 may be freely moved, and rapidly from position 1 to position 2, that is, for the shift from low or direct to first overspeed, and the porting of the valves 220, 230 of Figs. 19 and 20 and of the passage dimensions so arranged that the draining of pressure from port 192 does not occur too rapidly. The actuator method for brake band 37(B) is to have balanced pressure above and below piston 171 during low or direct, so that a simple opening of line 217 to drain through ports 213, 198 to the exhaust space, permits the pressure already in line 216 and below piston 171 to apply the brake 37 immediately upon exhaust of line 217, while line 218 of clutch D is in the process of draining.

Furthermore, it will be seen that in Fig. 12 looking toward the rear of the unit from the engine or input end, and remembering that the reaction hand of rotation is the same as the input hand of rotation, the band 37 when applied by force delivered to strut 161 will self-energise, assuming the engine to have normal clockwise rotation. The movable end of band 37, as soon as friction force is developed with the drum 25, will tend to tauten the band, giving full drum contact in a split second. The result is that the inertia of the rotating parts including the drum is quickly absorbed, and the instant the drum 25 stops, drive proceeds in the second forward speed. The time interval here, is extremely short.

This is a departure from earlier fluid pressure actuation arrangements in which the bands of planetary gears were energised such that during the energy absorption interval, there could be no self-energising effect permitted.

Similarly, in the present invention, this principle is also applied to the control and actuation of the brake A(36), as will be seen from inspection of Figs. 3 and 13.

When driving in second forward (first overspeed) ratio, drum 21 rotates faster than carrier 9, and when changing to third forward speed, it is necessary to bring drum 21 to rest, while permitting drum 25 to idle reversely, since the primary group alone provides the 4-to-1 overspeed, applied to sun gear 15 through rotation of planet gears around the stopped annulus gear 17. Since carrier 22 is stopped, forward rotation of sun gear 16 idles annulus 23 backward at a reduced spin ratio.

To provide a certain control over the alternate operation of brakes A and B, the control pressures are arranged to interlock, as describd above, and further following.

Inspection of Figs. 20 and 21 together shows that when the applying pressure for brake 37 is cut off by bloss $b$ of valve 230, the trapped pressure on both sides of piston 171 must be relieved through lines 217, 216, the latter by ports 196, 195, cross connection 214, and port 212, while 217 is drained by port 213 which with port 212 is relieved through exhaust port 198. The relief for the upper faces of pistons 185, 187 is by line 215 which connects to the same relief lines as line 216 for the rear brake B. The large volume of liquid moved from cylinders 183, 186 to line 215 plus that from cylinder 170 is required to pass through the restricted porting shown, to exhaust, so that the brake applying pressure below pistons 185, 187 is effective only when the pressure drop above these pistons indicates that the pressures in cylinder 170 are about equalized.

In shifting down from third to second overspeed, it is required that pressure be established in line 216 and below piston 171, to energise brake 37(B) before brake 36(A) is released by equalized pressure fed above the pistons 185, 187 by pressure in line 215.

The shifting of the valves from positions V to IV, as from the stations shown in Fig. 21 to those of Fig. 20, admits pump pressure simultaneously to lines 215 and 216. In position IV (Fig. 20) line 217 remains open to exhaust, so that the rise of pressure below piston 171 is not opposed by trapped fluid pressure, but increases as soon as the resistance of the brake 37 and its springs 167, is felt. This rise of pressure occurs in line 215 since the latter is connected to the same point as 216, therefore the rise of pressure felt when the mechanical resistance of brake 37 is met, is transmitted to line 215, to raise the counterpressure above pistons 185, 187, relied upon to balance out the engaging pressure of brake 36 which had priorly been actuated by the continuing pressure in line 130.

The above described interlocking of the pressure control means serves the useful purpose of retaining torque during the shift intervals, so that the transitions are not only smooth, but also the shifts occur without the drive mechanism passing through a zero torque interval, except at neutral.

It is proper to review briefly the sequence of the change of pressure flow when shifting down from top gear such as established by the arrangement of Fig. 21, to the gear ratio next below, as established by the arrangement of Fig. 20.

It will be observed that in order to transfer the torque reaction from brake A to brake B, pressure is admitted to both of lines 215 and 216. The first of these applies pressure to the upper sides of pistons 185, 187, equalizing the supply line pressure delivered through passage 136 and 201, therefore the front brake A is released by its spring 182. The application of pressure to line 216 directly applies the rear brake B by shifting the piston 171 upward against its retracting spring 167.

Should the operator desire to shift down to the lowest forward ratio in which the clutches C and D only are actuated, it is necessary to apply pressure to line 218 for actuating clutch D while retaining the pressure on clutch C, and at the same time to introduce pressure to line 217 to equalize that furnished by line 215, this latter action balancing the pressure on piston 171, which permits spring 167 to release brake B.

In shifting back to neutral as shown in Fig. 18 from the driving arrangement determined by the disclosure of Fig. 19, it is only necessary to relieve the pressure which had been engaging clutch D, by connecting line 218 with exhaust.

In shifting to reverse from neutral of the Fig. 18 valve arrangement, to that of Fig. 17, a very considerable change in the delivery of fluid pressure occurs, since all of the pressure lines which were active for neutral drive are now disconnected from the pump, and pressure line 218 for clutch D is now the only pressure line active.

In making the forward shifts from neutral it is required that for the first driving ratio, the pressure only needs to be newly applied to one pressure line, namely 218; for the next step the pressure of line 218 is exhausted and that which was in brake line 217 is exhausted.

For the 3rd and last forward drive step the remaining brake cylinder lines 215 and 216 are cut off from the pump, leaving only line 152 active to delivery energizing pressure to clutch C. The above instructions while repetitional, are believed useful for a thorough understanding of the shift control arrangement. It should be made clear that the operator is free to change the driving ratio by manipulating handle 200 at will, the only restriction being in the dwell characteristic established by the notches of the slot 206 and the pawl 205 of button 203 of the control handle 200. Referring to Fig. 15 it will be noted that a free shift may be made with the handle swinging between the reverse and neutral positions, but the operator must hold button 203 against the action of spring 208 to keep the pawl out of the slot notches. Releasing of pressure on the button allows the spring 208 to push the pin 205 into its outmost position. The handle 200 is swingable freely between neutral and 1st speed positions. To shift from 1st to 2nd speed forward, the button must be depressed, and held, but after reaching 2nd speed position, the button is again shifted along with the pawl 205 into the outmost position.

The operator may thereafter swing the handle 200 freely back and front between the 2nd and 3rd speed positions. By this method of correlating the shift action, it is difficult for an operator to make a skip shift since within the limits of the design illustrating the present specification, and the momentary dwell in which the operator is required to manipulate the button, serves to prevent the creation of excessive torque on the driving mechanism such as might occur under maximum engine power at a time when the torque requirement of the vehicle drive would be suddenly increased.

In view of these detailed instructions it is not deemed necessary to describe the operation further.

The above instructions are believed sufficient for one skilled in this art to reproduce in various forms, the teachings of the present invention. The description herewith while directed to the drive of a military vehicle, and as applicable to other heavy duty drives; however the inventive teachings herein are not restricted to use in heavy vehicles.

Certain outstanding advantages appear in the ability of the driver of a vehicle equipped with the invention to operate with a high degree of mobility, at a high performance rate, and when desired, at cruising economy. As will be evidenced by the drawings herewith, a very considerable capacity for handling large variable torques is compressed into a small unit occupying a small volumetric space, and the entire mechanism is self-contained, adaptable for various drive purposes, and simply controlled. The ratio shifts may be made under full torque, although the device is capable of high performance at part throttle or under partial load operation.

One will discover upon study of Figs. 3 and 5, and upon reflection, that for each ratio shift, under a given load and throttle, the torque converter portion of the mechanism readjusts itself to the new torque characteristic as changed between it and the final drive, and this readjustment is automatic, as well as providing reasonably efficient use of the engine power, since the horsepower of the engine bears a definite design relationship to the torque capacity and the effective speed ratio range of the torque converter. It appears highly essential that these selected ratio shifts take place rapidly, at least faster than the release of driving torque would permit loss of rolling momentum. The present invention provides this effect.

It is appreciated that early inventors have shown torque multiplying or demultiplying gearing in series with fluid torque converters.

The applicant's experience shows that in large, heavy vehicle drives if the self-braking effect is to be avoided, with loss of momentum, the torque ratio transitions should not only be quickly achieved, but also that the shifts be completed without a dwell or no-torque interval. As taught herein, the transitions are made with a minimum torque value in net effect always maintained, so that with my assembly the vehicle operator may shift freely from one forward drive ratio to another, while the drive control and actuation system provides shockless and effortless shift, the torque value persisting being sufficient to avoid loss of vehicle momentum.

At the time of changing ratio in the unit V, the comparatively enormous momentary inertia of the vehicle does not change rapidly, and the vehicle speed does not change for a measurable seconds interval. If the ratio in the unit V is quickly changed, while the engine power is held at a given value, the torque converter automatically changes its speed ratio and output torque commensurate with the change in ratio in unit V.

For example if the unit V changes ratio up from direct or 1 to 1, to the new ratio of 2 to 1 overspeed, the mechanical advantage against which the torque converter has to work is increased, and if it be assumed that the converter output shaft was at 1500 R. P. M., and is during the shift reduced to 750 R. P. M., the torque converter torque is doubled. Although a doubling of speed ratio in unit V is imposed, the entering torque into it has doubled, and the net output torque and speed has remained constant.

This shift may change the speed ratio of the torque converter, for example, from 0.7 to 0.35, and the torque converter hereafter may then work up to its peak efficient ratio.

The torque converter of the present disclosure does not provide constant input speed to a given torque, but requires a commensurate rise in input speed with speed ratio, therefore during upshift in unit V, when the torque converter speed ratio may drop from 0.7 to 0.35, the input resistance of the torque converter is somewhat increased so that the input speed will fall off to about 150 R. P. M., less, the engine seeking a new power equilibrium at a lower speed. This effect occurs over a measured time interval greater than that required for shifting ratio in unit V, the differential inertia of the engine and input parts of the torque converter not requiring absorption by the friction members, clutches and brakes, of unit V. The inertias that are so absorbed, are those of the rotating transmission parts and the converter output member, these values being small compared with the engine inertia values.

As a consequence of this set of circumstances, the rate of shift actuation of the clutches and brakes of unit V can be very fast, and preferably so, when it be desired to avoid the complications of auxiliary shift graduation controls. It seems to be novel to combine the factors described in the instructions herein, so as to provide for a rapid shift of ratio actuation. Actually, the brake bands and clutches last longer and wear better if they are actuated quickly, in this combination, which discovery is important in that it permits simplification of the controls in a manner not practicable in other speed ratio changing mechanisms. The time interval of torque overlap when changing from one friction member to another is obviously reduced, so that the phenomenon known as torque "fight" is practically absent. This effect is caused by opposing torque components derived from two torque paths having mutual interaction over a period, during which one and the other path alternate without a sequential positive transfer of torque. In this discussion, it should be understood that while the ratio transitions may be said to be instantaneous, they are in fact not, since there is a small time lag arising from the elasticity of the parts under load, and from the fluid displacement time of the servo actuation system fed by pumps of finite capacity. This interval is, however sufficient for the absorption of the inertias of the transmission parts and of the output rotor element of the torque converter.

While it is understood that change speed gearboxes of various types have been arranged in series with fluid turbine drives of different designs, it is believed a novel teaching in the present invention, to provde a series gearbox in which the ratios are overlapped and rapidly changed and in which the differential engine inertia is absorbed in the torque converter after the transmission elements have been established in a new ratio.

These results, as noted above, are derived from the stated relationships of the fluid pressure actuators for the clutches and brakes to the valving and porting of the supply and control system; and in part from the utilization of the self-wrapping principle in the mounting of the bands 36 and 37 discussed above. In actual practise the invention accomplishes all of the stated shifts in short time intervals comparable with the timing of equivalent shifting of a passenger car transmission.

The above discussed advantages, and those herein described in connection with the construction example utilized to demonstrate the novelties of the present invention, and as stated in the objects of the preamble of this specification are believed amply set forth.

While I have illustrated and described a particular embodiment of the inventions herein, it is obvious that modifications thereto will occur to those skilled in the art, and it is therefore desired to be clearly understood that the inventions are not limited to the particular arrangements disclosed in the example, it being intended in the appended claims to cover all such modifications which lie within the spirit and scope of my inventions.

What I now claim as new and desire to secure by United States Letters Patent is:

1. In variable speed drive devices, a power shaft, a load shaft, a fluid pressure supply system including a plurality of pumps driven by said shafts, a power transmission arranged to connect said shafts at variable torques and speeds, said transmission including a gear unit containing a plurality of members actuable to establish selected forward and reverse drive ratios for said transmission, fluid pressure actuators for said members operable two at a time in a plurality of ratio drive combinations for establishing said selected drive ratios by said members, selector valving operative to feed pressure furnished by said pumps to said actuators in a predetermined pattern of actuation for said members effective to provide said plurality of drive ratio combinations and in each combination, to provide said drive by simultaneous actuation of two of said actuators, and a manually operated control for said valving movable to station same in reverse setting and in a plurality of forward drive controlling settings for obtaining said drive combinations.

2. A control for power transmissions equipped with plural drive trains and having fluid pressure actuable members arranged to establish a plurality of speed ratios by simultaneous actuation of two of said members selectively for a predetermined transmission drive ratio, the combination in which are provided actuator pistons operative upon said members, cylinders for said pistons, fluid pressure delivery passages connected to said cylinders and in which said control consists of two selector valves movable together in parallel motion for connecting a source of fluid pressure with said fluid pressure delivery passages for said cylinders to provide a sequence of increasing drive ratios for said parallel motion of said valves in one direction and of decreasing drive ratios in the other direction, and means consisting of fluid pressure passages connected to said valves and connecting the cylinders for at least two of said pistons such that for alternate selected actuation of one of said two pistons, the fluid pressure condition of the actuator for the other of said two pistons determines the rate of actuation of the first said pistons.

3. In controls for variable speed transmissions, step ratio gearing having a plurality of actuable members arranged to be actuated two at a time for establishing selected driving ratios between input and output shafts of said gearing, fluid pressure means consisting of fluid-pressure operated pistons effective to actuate said members and fluid pressure feed passages directing pressure to said pistons effective to prevent actuation of at least two of said members by simultaneously providng fluid pressure opposing the actuation of said two members, and valving controlling the pressure of said passages shiftable to successive station positions for selecting changes of ratio by said gearing, and providing predetermined driving ratios through releasing of the said opposing fluid pressure when shifted from one valving position to another.

4. In variable speed transmission drives providing continuous torque over a range of changeable driving ratios between input and output shafts, the combination of a transmission unit consisting of a gear element adapted to be coupled to said output shaft another gearing element rotating with said input shaft, a primary gear group including said input gearing element, a secondary gear group including said output gear element, a primary group reaction element, an actuable and releasable member for preventing rotation of said reaction element, a secondary group reaction element and an actuable and releasable member for similarly preventing rotation thereof, a clutch for connecting said secondary group reaction element to said output shaft, a clutch for connecting said first named gear element to said output shaft, actuator members for engaging each of said clutches, a plurality of fluid pressure operated actuators one for each of said reaction element members and said clutch engaging members, a fluid pressure supply and control valving for selectively delivering actuation pressure to said actuators for said members said valving consisting of elements movable to establish a predetermined range of successive increasing and decreasing ratios by delivery of said pressure to delivery passages for said actuators to provide simultaneous actuation of two of said members for each of said drive ratios, and an arrangement of said valving elements said actuators and said delivery passages establishing at least one transition between two of said ratios during which the rate of actuation of one of said actuators is operative to control the release of another of said actuators, said arrangement including a fluid pressure connection operative to deliver a releasing fluid pressure for said second one of said actuators while delivering actuating pressure for the said first one of said actuators.

5. In controls for variable speed devices providing continuous torque between input and output shafts, the arrangement of a constant torque driving transmission embodying drive means operative to establish a range of speed ratios between said shafts, which drive means includes elements providing direct drive and two overspeed ratios, the combination including actuating mechanisms adapted to establish said ratios in accordance with a sequential ratio pattern of operation, fluid pressure means for operating said mechanisms, biasing springs effective to oppose the action of said fluid pressure means on said mechanisms, a fluid supply and control system for said fluid pressure means, and regulating and control valving included in said system and including fluid pressure devices effective to establish a balance action of the fluid pressure of said mechanism in various settings of said valving such that for a predetermined ratio valving setting, one of said mechanisms is rendered ineffective by its said biasing spring.

6. In variable power transmission drives, operative to provide continuous torque, an engine, a fluid torque converter coupled to said engine, a planetary gear unit driven by said converter and adapted to drive said load shaft, gear train reaction supporting mechanism operable to establish a plurality of gear drive ratios of said unit between the output of said converter and said load shaft, coupling means for said unit operable to establish gear drive ratios conjointly with or separately from said mechanisms, actuators for both said coupling means and said mechanisms adapted to provide speed ratio shifts in said unit, and a control device for said actuators operative to cause said actuators to provide rapid operation of one of said drive-establishing mechanisms while another of said mechanisms is being slowly released from support of the drive.

7. In a vehicle driving and track laying mechanism including a prime mover, and including a variable speed ratio drive train providing continuous torque drive of said mechanism, the combination of a fluid torque converter adapted to be driven by the prime mover, said train consisting of a change speed gear constantly connected to the output of said torque converter and driving a dividing differential gear unit, the divided output members of said unit each driving track laying devices thru individual reduction gear groups, said gear being equipped with actuable ratio-determining friction members operable to provide change of drive while maintaining continuous torque between said converter and said unit; and connecting drive means coupling said prime mover and said torque converter consisting of fixed-ratio primary and secondary gear trains connected to said prime mover and said converter, said trains being constantly connected by a drop-shaft member located below the drive centers of said converter and said engine.

8. In the combination set forth in claim 7, the subcombination of a housing for said converter, said gear and for said unit, an operator station space located above the said member and control means for the drive of said change speed gear located on the upper portion of said housing, said control means consisting of a manually rockable lever fixed to a shaft extending within said housing, and of ratio selecting members connected to direct the change of speed ratio of said drive train.

9. In the combination set forth in claim 7, the sub-combination of fluid pressure supply means consisting of fluid pressure passages and pumps driven by the input of said torque converter and by the output of said change speed gear of said train, of fluid pressure actuated means supplied by said pumps for establishing changes of drive by said gear, of a housing for said converter and said gear, and of control means for said fluid pressure actuated means located on the upper portion of said housing said control means consisting of controllable valves operative to direct actuating fluid pressure from said pumps selectively to said actuated means.

10. In vehicle drives, the combination of an engine-driven fluid torque converter having an output turbine member constantly connected to the input member of a planetary gear unit operative to provide plural forward and reverse drive to an output member of said unit, operating means for said unit consisting of a coupling clutch engageable to establish direct drive therein and reaction braking mechanism operative to establish geared drive therein, actuators for said clutch and said mechanism selectively energised for engaging the said clutch and operating said mechanism, a coordinating device for the actuator of said clutch and one of said mechanisms, and manually operable controls for said actuators and said device effective to cause said actuators to shift the actuation of said coupling clutch and said reaction braking mechanism rapidly and without dwells, the said device operates to coordinate the said actuators during the transition intervals when said manually operable controls are causing the changing of the coupling actuation of said clutch and of said braking mechanism, the drive torque is maintained and the existing differential of coupling torque on the output of said torque converter is absorbed in enforced differential rotation between the said output and input of said converter.

11. In vehicle drives, the combination of a fluid torque converter driven by an engine and driving a change speed gear adapted to drive a load shaft consisting of a first planetary unit having a carrier constantly connected to the output member of said converter, planet gears supported on said carrier and meshed with an annulus gear and a sun gear; a second planetary unit having a sun gear adapted to be connected to said load shaft, a carrier supporting a second set of planets meshed with said last-named sun gear and constantly connected with said first-named annulus gear, and an annulus gear meshing with said second named planet gears said latter annulus gear being adapted to be connected to said output shaft, an intermediate shaft constantly connecting said sun gears, braking means for each of said annulus gears, and clutch mechanism selectively operative to connect said load shaft with said second named annulus or said second named sun gear, actuators for said braking means and said clutch mechanism selectively operative to engage and disengage said clutch and to apply and release said braking means, and a translatable control for said actuators selectively operable to provide a sequence of forward ratio drives between said engine and loadshaft by said converter and gear, and operable to provide reverse drive therebetween by causing actuation of the one of said mechanisms for braking the said first-named annulus gear.

12. In variable ratio transmissions, a transmission casing, a power input shaft, an intermediate shaft, an output shaft, said shafts being supported in said casing for axial alignment, a plurality of gear units supported in said casing having gear elements adapted to be connected to transmit variable speed ratio drive between said input and output shafts, reaction elements for said units, brakes adapted to stop rotation of said reaction elements, coupling means consisting of a drum fixed to said output shaft and enclosing clutch members adapted to connect the drum to one of the gear elements and a second drum located radially outside of said first-named drum and connected to one of said reaction elements, a second set of clutch members adapted to connect said drums, selective operating mechanism for said clutch members effective to establish drive between said first-named drum and one or the other of said named gear elements, selective operating brake mechanism for said brake actuators for said clutch and brake mechanisms, a translatable control for said mechanism actuators movable linearly from a reverse drive-establishing position thru a neutral station and successively to a lower forward and two higher forward ratio determining positions, the motion of said control in the said linear sequence being effective to cause actuation of two of said mechanisms for each of the drives in reverse and in the three forward speed ratios determined by said control.

13. In a fluid pressure circulation system, a transmission assembly including a variable speed gear driven by a fluid torque converter and having input and output shafts, a fluid working space in said converter, lubrication passages for said gear, a plurality of supply pumps driven by said shafts and drawing fluid from a common sump, fluid pressure operated actuation means for establishing a plurality of drive ratios of said gear, feed connections between a first one of said pumps adapted to supply fluid under pressure to maintain said fluid torque converter working space under positive pressure and to supply said ratio-establishing means, a pressure outflow connection leading from the said working space to said lubrication passages for said gear, pressure feed connections leading from a second one of said pumps to said actuation means and commonly connnected to said passages, and valving operative to vary the relative pressure flow of both said pumps to the said feed connections.

14. In the combination set forth in claim 13, the sub-combination of a fluid cooler device, of a fluid connection leading from said working space to said cooler, of a fluid connection leading from said cooler to said working space for recirculation of fluid between said cooler and working space, said connections constituting feed and return lines for the flow of fluid between the working space and the cooler, and of valving operative to control the rate of flow through said cooler.

15. In the combination set forth in claim 13, the sub-combination of a regulator valve for the output of said first-named pump having one operative position in which it delivers fluid at full pressure to said actuation means while restricting the flow to the said working space, and having a series of further positions in which it increases the flow of fluid progressively to said working space with increase of pumped pressure, said valve responding to rise of pumped pressure on an effective area of the valve exposed to said pumped pressure.

16. In the combination set forth in claim 13, the sub-combination of a fluid cooler adapted to extract heat from the fluid being circulated in said converter, a flow passage from said working space to said cooler, of a delivery connection between the outlet of said cooler and the input or suction of said first-named pumps and of a valve responsive to fluid pressure of said delivery connection to control the permitted flow from said cooler to said pump.

17. In the combination set forth in claim 13, the sub-combination of a fluid cooler connected to said space to extract heat from the fluid circulating in said working space and to recirculate cooled fluid to the said space, of connecting passages between said cooler and said space, and of a valve in control of the flow in said passages responsive to the temperature of the fluid at the periphery of said working space operative to control the flow from the said space to the said cooler and thereby regulate the degree of recirculation of fluid thru said cooler and said working space.

18. In a variable ratio transmission control system for determining the drive ratios between an engine shaft and a load shaft, a friction clutch engageable for transmitting torque in a plurality of said drive ratios, a fluid pressure operated actuator for said clutch effective to hold same engaged under variable fluid pressure, a fluid pressure supply, control valving operable to direct pressure from said supply to or to release pressure from said clutch actuator and movable to neutral and drive control positions, a first pump driven by said engine shaft, a second pump driven by said load shaft, said pumps being arranged to provide said supply, a neutral position of said control valving in which the said friction clutch actuator is energized by pressure provided by said first pump, an adjacent drive position of said control valving in which the said clutch remains so energised by the said first pump pressure, and a passage fed by the pressure delivered by said second pump and connected to said actuator to augment the effective loading pressure of said actuator upon said clutch during an interval when said load shaft is driving said second pump.

19. The combination recited in claim 18 in which a second friction clutch is similarly engageable for transmitting torque in a plurality of said drive ratios including reverse drive ratio, a second fluid pressure operated actuator for said second clutch is effective to hold same engaged under pressures provided by said control valving when placed in reverse drive control positions, and an arrangement of said second pump passage with respect to said valving and to the said first clutch actuator operative to drain the said first clutch actuator during reverse rotation of said second pump caused by reverse rotation of said load shaft.

20. In a power drive mechanism, a power shaft and a load shaft, a variable speed ratio transmission assembly embodying selectively established gear trains and including fluid pressure actuators for establishing selective ratio drive of said assembly, a fluid turbine drive device for coupling said power and load shafts, a casing for said device, a fluid working space of said device, an impeller rotor of said device having blades in said space, a plurality of pressure supply pumps adapted to provide a body of fluid to the said space under pressure and to said actuators, a pressure delivery space connected to one of said pumps and located in said casing adjacent the said impeller, feed ports in said impeller rotor opening into the said working space from said delivery space, an exit pressure space connected to said converter working space, a relief passage for said exit pressure space, a valve in said relief passage operative to open same to a lower pressure channel at a given pressure of said relief passage, an outflow port for said working space in said casing, an outflow conduit connected to said outflow port, a cooler connected to said conduit, an inflow conduit connecting said cooler to said pressure delivery space of said casing, and a second valve located in said outflow conduit variably responsive to the temperature of said working space fluid for controlling the rate of flow of the fluid thru the said conduits.

21. In the combination set forth in claim 20, a change speed gear train driven by the said loadshaft and driving an output shaft, lubrication passages for said gear train, a second pump of said plurality of pumps, a connection from said relief passage to said lubrication passages operative to deliver thereto a portion of the fluid pumped by said first named pump to said working space, a second connection from the output of said second pump to said lubrication passages, said valve being located between said first and second connections and subject to the pressure of said exit pressure space and to the pressure of said lubrication passages provided by said second pump.

22. A fluid pressure supply system for a fluid turbine drive device consisting of bladed rotors forming a fluid working space having a power connected rotor and a load connected rotor, and for a change speed gear driven by said device, a lubrication feed channel for said gear, a pressure delivery passage and a pressure relief passage for said working space, a connection between said relief passage and said channel, a first pump arranged to deliver fluid under varying pressure to said first named passage to maintain said working space filled and to furnish lubricating fluid to said channel, a second pump arranged to deliver fluid under variable pressure to said channel, and a valve in said connection responsive to the differential pressures provided by said pumps to said connection from said first pump and to said channel by said second pump, the arrangement being effective to supply said channel under different operating conditions when one of said pumps is not operating to supply pressure for said system.

23. In the combination set forth in claim 22, a valve in the first said delivery passage of said first pump operative to control the fluid delivery thereof to said working space, a pair of fluid circulation conduits for the fluid of said working space connected to a cooler, the said conduits being arranged to accept pressure fluid from the outer periphery of said working space and to return same to the space at an inner portion thereof, a suction space for said first pump, a connection between said suction space and one of said conduits, and a valve in said connection responsive to the rise of pressure in said one of said conduits for opening the said connection and relieving the conduit pressure.

24. In the combination set forth in claim 23, the further combination of a thermally operable valve controlling the flow of said conduits thru said cooler, said valve occupying a position to vary the flow in one of said conduits in accordance with the temperature of the fluid of the said working space.

25. In fluid pressure systems for power drive mechanisms, a fluid turbine drive device having a power-driven impeller and driving the input of a change speed gear train, a loadshaft connected to be driven by said train, a fluid working space of said device, a power-driven pump connected to supply a moving fluid body under pressure to said space, selective ratio control valving for determining the fluid pressure actuation of the elements of said gear train, input and delivery porting for said valving, a composite pump driven by said load shaft consisting of a driving gear, an idler gear meshing with said driving gear and a second idler gear driven by said first idler, said three gears constituting two operative pumps having a common driver, pressure and suction spaces for the first of said composite pumps formed by said first two mentioned gears, a pressure delivery connection from said pump pressure space leading to said lubrication channel, a regulator valve for the pressure of said connection arranged to connect said pump spaces at a given pump delivered pressure, pressure and suction spaces for the second of said composite pumps formed by said second and third gears, a pressure delivery connection from said latter pressure space leading to the input porting of said servo control valves, a pressure delivery connection from said power driven pump to said control valve input porting, and a pressure responsive valve effective to control the pressure supplied by the said power-driven pump to said working space and to the said porting.

26. In track-laying vehicle drives having an arrangement of power devices in which an engine located at one end of the vehicle drives a group of drive-transmitting elements is located at the other, with connecting shafting to drive the latter group from the said engine, and thereby apply power to laterally disposed track driving members; the combination of an engine shaft and of a fluid torque converter with a power input and output shafts approximately concentric with said engine shaft, a connecting power shaft adapted to transmit the power of said engine to said converter input shaft and located lower in said vehicle and parallel to said first named shafts, a first fixed ratio gear train connecting said engine and said power shafts to rotate in the same direction, a second fixed ratio gear train connecting said power and converter input shafts to rotate in the same direction, a track-laying vehicle drive having laterally placed output members, a final drive gearing having an input differential gear and output fixed gear reduction trains driving each of said members, a change speed gear train operative to transmit the power of said converter output shaft to said differential gear at selected forward and reduced speed ratios without interruption of the drive torque, a casing for said converter and said change speed gear train, and a control station located on the upper portion of said casing for said change speed gear train comprising a sector, a rockable lever, a rockable shaft protruding from said casing and operated by said lever, and controller mechanism inside said casing, movable by said rockable shaft to establish reverse, neutral and a range of forward speed ratios.

27. In a fluid pressure and servo control system, a variable speed ratio transmission having driving and driven shafts, a drive assembly operated to connect said shafts and including a planetary gear unit having a reaction element to be stopped from rotation for establishing a gear drive thru said unit and connect the said shafts for one ratio of gear drive, a casing for said unit, a reaction brake band for stopping rotation of said element and provide said one ratio of geared drive, said band having an anchor end supported by said casing and having a movable end, a mechanism for applying and releasing said movable band end, said mechanism including a piston rod and a spring arranged to bias said rod in a direction to apply a brake releasing force to said band, a pressure supply pump, a pressure feed line from said pump, a servo cylinder having divided coaxial pressure chambers, a piston in each chamber connected to move said rod, pressure feed passages for said cylinders consisting of one passage branched to deliver pressure to both said chambers in a direction for applying a force to said pistons for opposing the force of said spring, a second passage branched to deliver pressure to both chambers in a direction for applying a force to said pistons to counteract the pressure delivered by said first passage, a pressure connection from said pump feed line to said first-named passage, and selectively operable valving connected to deliver pressure from said line to said second-named passage and operable to exhaust said latter passage, for determining the application and release of said band for initiating or terminating the said one ratio of geared drive by said planetary unit.

28. In fluid pressure systems for power drives, an engine, a fluid torque converter driven by said engine, a gear transmission driven by said converter, a load shaft connected to be driven by said transmission, a fluid working space of said converter, lubrication passages for said transmission, a first pump device driven by said engine connected to supply said working space and said lubrication passages when said engine is rotating and the said load shaft is standing still, a second pump device driven by said load shaft connected to supply said lubrication passages when the said load shaft is rotating, a feed connection from said second pump device to said lubrication passages, a connection supplied by said first pump device for delivering fluid to said lubrication passages, and a pressure responsive valve between said connections operative to close said valve at a predetermined excess of pressure in the feed connection from said second pump device and to open the valve at a predetermined excess of pressure in the connection from said first pump device.

29. In the combination set forth in claim 28, fluid pressure operated actuators for said transmission adapted to be selectively energised for establishing forward and reverse speed ratios of drive between said engine and load shaft, a valve body and valving therein connected to deliver fluid pressure to said actuators for establishing said drive ratios, plural feed connections to said valve body and said valving consisting of a first connection supplied by said engine driven pump, and of a second connection supplied by said second pump, and a feed connection for one of said transmission actuators constantly supplied by said first feed connection.

30. In controls for variable speed devices providing continuous torque between input and output shafts, the arrangement of a constant torque driving transmission embodying drive means operative to establish a range of speed ratios between said shafts which drive means includes elements providing direct and two selected gear drive ratios, the combination including mechanisms actuatable for said drive means adapted to establish said ratios in accordance with a sequential ratio patttern of operation, a fluid pressure operated actuator for each of said mechanisms, biasing springs effective to oppose the action of said actuators upon said mechanisms, a fluid pressure supply and control system for said actuators, and pressure regulating and pressure selecting and directing valving included in said system and including a fluid pressure device effective to balance the action of the fluid pressure in one of said mechanisms in a selected setting of said directing valving and operative to permit the biasing spring of said one of said mechanisms to exert biasing force.

31. In a variable ratio transmission control system for establishing a range of drive ratios between an engine shaft and a load shaft, a variable ratio transmission unit arranged for providing selective drive between said shafts, said unit having a plurality of friction members energisable to determine a pattern of drive selection, one of said members constituting a clutch arranged in said unit for transmitting torque in a plurality of drive ratios of the unit, a fluid pressure actuator for said clutch adapted to hold same engaged under fluid pressure, control valving movable to direct pressure to or release same from said actuator, a second friction member in said unit, a fluid pressure actuator for said second member, a fluid pressure supply, feed passages from said supply to said valving, delivery passages from said valving to said actuators, a biasing spring for said second member providing force tending to actuate the member, fluid pressure connections of said valving to said delivery passages operative in one setting thereof to oppose the force of said spring for preventing actuation of said member, and operative in another setting to deliver pressure to said clutch actuator at the same time said pressure is being delivered to oppose the force of the pressure first provided to the actuator for said second friction member.

OLIVER K. KELLEY.

REFERENCES CITED

The following references are of record in the file of this patent:

UNITED STATES PATENTS

| Number | Name | Date |
|---|---|---|
| 817,908 | Folberth | Apr. 17, 1906 |
| 1,413,147 | Wickersham | Apr. 18, 1922 |
| 1,619,701 | Chorlton | Mar. 1, 1927 |
| 1,839,088 | De Normanville | Dec. 29, 1931 |
| 2,149,117 | Dodge | Feb. 28, 1939 |
| 2,182,386 | Patterson | Dec. 5, 1939 |
| 2,190,830 | Dodge | Feb. 20, 1940 |
| 2,190,831 | Dodge | Feb. 20, 1940 |
| 2,193,304 | Thompson | Mar. 12, 1940 |
| 2,193,305 | Thompson | Mar. 12, 1940 |
| 2,193,524 | Thompson | Mar. 12, 1940 |
| 2,301,957 | Lang | Nov. 17, 1942 |
| 2,332,593 | Nutt et al. | Oct. 26, 1943 |
| 2,343,955 | Cotterman | Mar. 14, 1944 |
| 2,361,104 | Jandasek | Oct. 24, 1944 |
| 2,378,577 | Oldfield | June 19, 1945 |
| 2,379,021 | Marchak | June 26, 1945 |
| 2,407,289 | La Brie | Sept. 10, 1946 |
| 2,433,052 | Kelley | Dec. 23, 1947 |